US011721076B2

(12) United States Patent
Boivin et al.

(10) Patent No.: US 11,721,076 B2
(45) Date of Patent: *Aug. 8, 2023

(54) SYSTEM FOR MIXING OR COMPOSITING IN REAL-TIME, COMPUTER GENERATED 3D OBJECTS AND A VIDEO FEED FROM A FILM CAMERA

(71) Applicant: NCAM TECHNOLOGIES LIMITED, London (GB)

(72) Inventors: Samuel Boivin, Saclas (FR); Brice Michoud, Chantilly (FR)

(73) Assignee: NCAM TECHNOLOGIES LIMITED, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/532,066

(22) Filed: Nov. 22, 2021

(65) Prior Publication Data
US 2022/0076501 A1 Mar. 10, 2022

Related U.S. Application Data

(63) Continuation of application No. 14/830,494, filed on Aug. 19, 2015, now Pat. No. 11,182,960, which is a
(Continued)

(30) Foreign Application Priority Data

May 9, 2012 (GB) .................................... 1208088

(51) Int. Cl.
G06T 19/00 (2011.01)
G06T 7/73 (2017.01)
(Continued)

(52) U.S. Cl.
CPC ............ *G06T 19/006* (2013.01); *G06F 3/017* (2013.01); *G06T 7/73* (2017.01); *G06T 15/20* (2013.01);
(Continued)

(58) Field of Classification Search
None
See application file for complete search history.

(56) References Cited

U.S. PATENT DOCUMENTS 8,401,276 B1 3/2013 Choe et al.
8,553,989 B1 * 10/2013 Owechko ............... G06V 10/25
382/154
(Continued)

FOREIGN PATENT DOCUMENTS

GB 2456802 A 7/2009
JP 2000222116 A 8/2000
(Continued)

OTHER PUBLICATIONS

Zhang et al., "A stereo matching algorithm based on multiresolution and epi-polarconstraint", Dec. 2004, IEEE, Third International Conference on Image and Graphics (ICIG'04), pp. 180-183 (Year: 2004).*

(Continued)

Primary Examiner — Kent W Chang
Assistant Examiner — Jonathan M Cofino
(74) Attorney, Agent, or Firm — Saul Ewing LLP

(57) ABSTRACT

The system generates real-time augmented reality video for TV broadcast, cinema or video games. The system includes a monoscopic video camera including a body, a stereoscopic video camera, and a processor. The system includes sensors, including multiple non-optical sensors, which provide real-time positioning data defining the 3D position and 3D orientation of the monoscopic video camera, or enable the 3D position and 3D orientation of the monoscopic video camera to be calculated. The processor is configured to use the real-time positioning data automatically to create, recall, render or modify computer generated 3D objects. The processor is configured to determine the 3D position and orientation of the monoscopic video camera with reference (Continued)

to a 3D map of the real-world generated whilst the camera is being used to capture video. The processor is configured to track the scene without a requirement for an initial or prior survey of the scene.

33 Claims, 8 Drawing Sheets

Related U.S. Application Data continuation of application No. 14/399,632, filed as application No. PCT/GB2013/051205 on May 9, 2013, now Pat. No. 9,600,936.

(51) Int. Cl.

| | | |
|---|---|---|
| G06T 15/20 | (2011.01) | |
| G06T 17/00 | (2006.01) | |
| G06F 3/01 | (2006.01) | |
| H04N 5/265 | (2006.01) | |
| H04N 5/272 | (2006.01) | |
| H04N 5/222 | (2006.01) | |
| H04N 5/262 | (2006.01) | |
| H04N 13/156 | (2018.01) | |
| H04N 13/204 | (2018.01) | |
| H04N 13/275 | (2018.01) | |
| H04N 13/239 | (2018.01) | |
| H04N 23/80 | (2023.01) | |

(52) U.S. Cl.
CPC ........... *G06T 17/00* (2013.01); *H04N 5/2224* (2013.01); *H04N 5/265* (2013.01); *H04N 5/2621* (2013.01); *H04N 5/272* (2013.01); *H04N 13/156* (2018.05); *H04N 13/204* (2018.05); *H04N 13/275* (2018.05); *H04N 23/80* (2023.01); *H04N 13/239* (2018.05)

(56) References Cited

U.S. PATENT DOCUMENTS

| 8,633,970 | B1 | 1/2014 | Kornmann et al. | |
|---|---|---|---|---|
| 2003/0052966 | A1 | 3/2003 | Trinkel et al. | |
| 2003/0076981 | A1 | 4/2003 | Smith et al. | |
| 2003/0202120 | A1* | 10/2003 | Mack | H04N 5/2224 |
| | | | | 348/E5.022 |
| 2005/0035980 | A1 | 2/2005 | Lonsing | |
| 2007/0248283 | A1 | 10/2007 | Mack et al. | |
| 2007/0288414 | A1* | 12/2007 | Barajas | G06N 20/00 |
| | | | | 706/46 |
| 2008/0158345 | A1 | 7/2008 | Schklair et al. | |
| 2008/0226123 | A1* | 9/2008 | Birtwistle | G06T 15/205 |
| | | | | 382/100 |
| 2009/0160852 | A1* | 6/2009 | Chang | G06T 7/0004 |
| | | | | 345/419 |
| 2010/0045701 | A1 | 2/2010 | Scott et al. | |
| 2010/0208033 | A1* | 8/2010 | Edge | G06T 19/006 |
| | | | | 348/46 |
| 2011/0090307 | A1* | 4/2011 | Marvie | H04N 13/172 |
| | | | | 348/43 |
| 2011/0206236 | A1 | 8/2011 | Center | |
| 2011/0214082 | A1* | 9/2011 | Osterhout | G02B 27/017 |
| | | | | 715/773 |
| 2011/0222757 | A1* | 9/2011 | Yeatman, Jr. | H04N 13/257 |
| | | | | 382/154 |
| 2011/0242413 | A1 | 10/2011 | Azzopardi et al. | |
| 2011/0254861 | A1* | 10/2011 | Emura | H04N 21/4622 |
| | | | | 345/633 |
| 2011/0285813 | A1* | 11/2011 | Girdzijauskas | H04N 13/111 |
| | | | | 348/E13.001 |
| 2012/0002014 | A1 | 1/2012 | Walsh et al. | |
| 2012/0069018 | A1 | 3/2012 | Yamaya et al. | |
| 2013/0113784 | A1* | 5/2013 | White | H04N 13/117 |
| | | | | 345/419 |
| 2013/0201291 | A1 | 8/2013 | Liu et al. | |
| 2013/0215229 | A1 | 8/2013 | Yerli et al. | |

FOREIGN PATENT DOCUMENTS

| JP | 2006003263 | A | 1/2006 |
|---|---|---|---|
| JP | 2009139995 | A | 6/2009 |
| JP | 2012068861 | A | 4/2012 |
| WO | 2008111495 | A1 | 9/2008 |
| WO | 2013/088076 | A1 | 6/2013 |

OTHER PUBLICATIONS

Bay, Herbert, et al., "Surf: speeded up robust features", Proceedings of the 9th European conference on Computer Vision—vol. Part I, ECCV'06, Berlin, Heidelberg, Springer-Verlag, 2006, pp. 404-417.
Bleser, G., et al., "Real-time vision-based tracking and reconstruction", J. Real-Time Image Proc., vol. 2, 2007, 161-175.
Calonder, Michael, et al., "Brief: binary robust independent elementary features", Proceedings of the 11th European conference on Computer Vision: Part IV, ECCV'IO, Berlin, Heidelberg, Springer-Verlag, 2010, pp. 778-792.
Chandaria, J., et al., "Real-Time Camera Tracking in the MATRIS Project", BBC Research White Paper WHP 147, British Broadcasting Corporation, Feb. 2007.
Chandaria, J., et al., "Real-Time Camera Tracking in the MATRIS Project", Proc. of IBC 2006, Amsterdam, NL, Sep. 7-11, 2006.
Chandaria, J., et al., "The MATRIS proejct: real-time markerless camera tracking for augmented reality and broadcast applications", J. Real-Time Image Proc, vol. 2, DOI 10. 1007/s11554-007-0043-z, 2007, 69-79.
Devernay, Frederic, et al., "Straight lines have to be straight", SPIE, vol. 2567, 2001.
Fischler, Martin, et al., "Random sample consensus: A paradigm for model fitting with applications to image analysis and automated cartography", Communications of the ACM, 24(6), 1981, 381-395.
Galvin, Bob, "Feature: Going Hollywood", Professional Surveyor Magazine, Feb. 2011.
Harris, Chris, et al., "A combined corner and edge detector", Proc. of Fourth Alvey Vision Conference, 1988, 147-151.
Hirofumi, et al., "A Registration Method Using Stereo Cameras with an Inertial Sensor for Augmented Reality", IEICE Technical Report, Image Engineering, vol. 99, No. 574, Jan. 20, 2000, pp. 1-8.
Kalman, Rudolph Emil, "A new approach to linear filtering and prediction problems", Transactions of the ASME—Journal of Basic Engineering, 82 (Series D), 1960, 35-45.
Kiein, Georg, et al., "Parallel tracking and mapping for small ar workspaces", Proceedings of the 2007 6th IEEE and ACM International Symposium on Mixed and Augmented Reality, ISMAR '07, Washington DC USA IEEE Computer Society, Jan. 10, 2007.
Leonard, J., et al., "Mobile robot localization by tracking geometric beacons", IEEE Transactions on Robotics and Automation, 7(3), 1991.
Lowe, David G., "Object recognition from local scale-invariant features", Proceedings of the Intl. Conference on Computer Vision—vol. 2—vol. 2, ICCV '99, Washington DC USA, IEEE Computer Society, 1999, 1150.
Marquardt, D., "Analgorithm for least-squares estimation of nonloinear parameters", SI AM J. Appl Math, Nov. 1963, 431-441.
Mei, Christopher, et al., "Rslam: A system for large-scale mapping in constant-time using stereo", Intl. J. Comput. Vision, 94(2), Sep. 2011, 198-214.
Meisters, Gary Hosier, "Polygons have ears", Amer. Math. Monthly, 82, 1975, 648-651.
Pitie, et al., "Matting with a Depth Map", Proceedings of 2010 IEEE 17th Intl. Conference on IMage Processing; IEEE, 2010.
Rosten, Edward, et al., "Faster and Better: A machine learning approach to corner detection", IEEE Trans. Pattern Analysis and Machine Intelligence, 32, 2010, 105-119.
Rosten, Edward, et al., "Machine learning for high-speed corner detection", Proceedings of the 9th European conference on Com-

(56) References Cited

OTHER PUBLICATIONS puter Vision—vol. Part I, ECCV'06, Berlin, Heidelberg, Springer-Verlag, 2006, 430-443.
Rublee, et al., "ORB: an efficient alternative to SIFT or SURF", Proceedings of the 2011 Intl. Conference on Computer Vision, ICCV 2011, IEEE Computer Society, 2011.
Sutherland, Ivan E., et al., "A head-mounted three dimensional display", Proceedings of the Dec. 9-11, 1968 fall joint computer conference, part I, AFIPS '68 (Fall, part I), New York, NY USA, ACM, 1968, 757-764.
Tsai, Roger Y., et al., "A new technique fortuity autonomous and efficient 3d robotics hand-eye calibration", Proceedings of the 4th Intl. symposium on Robotics Research, Cambridge, MA USA, MIT Press, 1988, 287-297.
Uhlmann, J.K., "Algorithms for multiple target tracking", American Scientist, 80(2), 1992, 128-141.
Zhang, et al., "A Stereo Matching Algorithm Based on Multiresolution and Epipolar Constraint", Proceedings of the Third Intl. Conference on Image and Graphics (ICIG '04) IEEE, 2004.
Koeser et al., "Robust GPU-assisted camera tracking using free-form surface models," J. Real-Time Image Proc. (2007) 2:133-147.
"Markerless Augmented Reality," retrieved from the Internet on Apr. 1, 2016; https://www.youtube.com/watch?v=luYzGJN7kkU; uploaded to YouTube on May 24, 2007.

\* cited by examiner

SYSTEM FOR MIXING OR COMPOSITING IN REAL-TIME, COMPUTER GENERATED 3D OBJECTS AND A VIDEO FEED FROM A FILM CAMERA

CROSS REFERENCE TO RELATED APPLICATIONS

This application is a continuation of U.S. application Ser. No. 14/830,494, filed on Aug. 19, 2015, which is a continuation of U.S. application Ser. No. 14/399,632, filed Nov. 7, 2014, which claims the priority of PCT/GB2013/051205, filed on May 9, 2013, which claims priority to Great Britain Application No. 1208088.3, filed on May 9, 2012, the entire contents of each of which is fully incorporated herein by reference.

BACKGROUND OF THE INVENTION

1. Field of the Invention

A system for mixing or compositing real-time, computer generated 3D objects and a video feed from a film camera, such as a video camera, to generate a real-time augmented reality video for TV broadcast, cinema or video games.

2. Description of the Prior Art

Over the past 20 years, there has been considerable research and commercial activity in this field; reference may be made to video insertion or augmented reality systems from companies, such as Sportvision, Inc, which has developed television viewing enhancements for sporting events, such as American football, adding a virtual first down line that viewers see super-imposed onto the pitch. Other companies that have developed systems in this area include PVI, Inc. One common feature of known systems is that they rely principally on analysing the features in the video feed from the camera to determine which part of the real-world scene the camera is pointing at; the system will have earlier built up a 3D map of that scene so that, once it knows where in the scene it is pointing at, it is able to add or composite computer generated objects (such as the virtual first down line) onto the video feed in such a way that the object's position and orientation makes it appear a natural part of the scene. One disadvantage of replying purely on the optical flow in this way is that such systems can be unreliable. Other systems rely on pure marker-based approaches (Lightcraft Technologies for example). They require an operator to put real physical markers (1 m×1 m large) on set to be detected by the system. It is highly inefficient as it needs hours or days to set up a stage, which is something very unlikely to work for movie production. It also has many constraints as the physical markers must always remain in the field of view of their system. Scientific references may also be made to the papers cited in Appendix 1.

BRIEF SUMMARY OF THE INVENTION

The present invention is, in one aspect, a system for mixing or compositing real-time, computer generated 3D objects and a video feed from a film camera, such as a video camera, to generate augmented reality video for TV broadcast, cinema or video games, in which:
the body of the film camera can be moved in 3D and sensors in or attached directly or indirectly to the film camera provide real-time positioning data defining the 3D position and 3D orientation of the film camera, or enabling the 3D position and 3D orientation of the film camera to be calculated and
that real-time positioning data is then automatically used by the system to create, recall, render or modify computer generated 3D objects and
the resulting computer generated 3D objects are then mixed in or composited with the video feed from the film camera to provide augmented reality video for TV broadcast, cinema or video games.

Optional features—some or all of which can be combined with each other, include the following:
the computer generated 3D objects are mixed in or composited in real-time with the real-time video feed from the film camera.

Real-time zoom, focus and iris settings of the film camera are measured and used, together with the real-time positioning data, so that the 3D objects are correctly rendered in a desired location and orientation in a 3D scene.

The sensors include an accelerometer, and a gyro (6DOF sensor).

The sensors include a 3-axis accelerometer measuring translational acceleration in 3D, a 3-axis gyro measuring angular velocity in 3D, and magnetometer measuring absolute heading in 3D, and hence constituting a 9DOF sensor, The sensors include a 3D range sensor, such as structured light or time-of-flight camera.

The 3D range sensor captures the depth of each pixel in a video output from the camera.

The depth of edges is refined by reprojecting the 3D range sensor depths onto the high resolution video feed of the film camera.

The sensors are formed into a unit that can be securely fixed to the film camerao The unit includes one or two witness cameras.

The unit includes a 3D range sensor that captures the depth of each pixel in a video output.

The unit includes a 6DOF or 9DOF sensor.

The unit uses switchable hangers to allow it to be fixed to different sizes and designs of film cameras and rods, The unit is extensible to include other forms of sensors.

The unit can form a survey device which can be used to survey a complex scene and transmit data defining the 3D scene being surveyed wirelessly to a computer which then tracks or recovers tracking of the scene.

Film camera includes conventional encoders to read the camera zoom, focus and iris.

System includes one single witness camera (monoscopic case) or two witness cameras (stereocscopic case), equipped with lenses which may be 180 degree fish eye lenses.

The witness camera(s) are off-set from the film camera and that off-set is obtained using a calibration chart including a first and second group of circles, each circle being in a known location with respect to one or more of the other circles and each circle being recognized using a blob image algorithm.

A lens of the film camera is calibrated for optical distortion using a calibration chart including several circles, each circle being in a known location with respect to one or more of the other circles and each circle being recognized using a blob image algorithm.

Film Camera is any of the following: crane camera; steady cam; hand-held-camera; dolly mounted camera, tripod-mounted camera, smartphone, augmented reality glasses.

The 3D position and orientation of the film camera is determined with reference to a 3D map of the real-world generated, in part, by using the real-time 3D positioning data from the sensors plus an optical flow in which witness camera(s) surveys a scene and software running on a processor detects natural markers in the scene ('feature points') that have not been manually or artificially added to that scene.

The system utilizes one or two high-speed (such as at least 100 fps) witness cameras to enable the system to be fully initialized without a separate stage of purely surveying the scene to be tracked (called 'instant survey'), but instead surveying takes place continuously whilst the camera is being used to capture video.

Stereoscopic system enables software to process the images and, even with the camera system not being moved at all, to generate an instant 3D point cloud (for example associating a large number of points in the scene to their position in a 3D space using knowledge of the separation between the two camera and epipolar geometry).

The depth of each pixel in the 3D point cloud is obtained using corresponding 2D texture patches obtained from each stereoscopic witness camera and an epi-polar line search algorithm.

System runs a fusion algorithm that combines optical flow data from the witness camera system with the real-time positioning data from the hardware sensors.

Fusion algorithm is based on an Extended Kalman Filter prediction/correction technique to integrate outputs from, and to re-calibrate, all the sensors, which may include an accelerometer, a gyroscope, a magnetometer, a 3D range sensor, to determine the position and orientation of the camera.

EKF fusion algorithm uses confidence level data, associated with the output from each sensor, when determining how to merge the data from each sensor.

Keyframes generated by the witness camera system are part of the visual tracking process and are real-time images computed at 4 different resolution levels of the witness camera video feed.

System includes (a) a content generating computer that provides 3D computer generated animation of virtual figures, objects and places, and (b) a rendering computer (which may or may not be separate from the content generating computer), and in which the real-time positioning data defining the 3D position of the film camera is used by either or both of the content generating computer and the rendering computer to cause real-time, computer generated 3D objects to be generated that can in real-time be inserted and mixed with the video feed from the film camera to form a natural part of the scene shown in that video feed.

The computer generated 3D objects are animations that can move anywhere within the scene and can alter their shape and appearance in a manner determined by the content generating computer.

Computer generated 3D objects are animated figures of people or creatures that move (e.g. run, dance, walk, fight, fly, jump, . . . ) in a realistic manner when mixed in the scene. Camera positioning or tracking data is also made available for use in post-production to facilitate post-production CGI.

The 3D range sensor is used to enhance the accuracy of a depth measurement associated with a reconstructed 3D point, or to reject that reconstructed 3D point.

The 3D range sensor is used for real-time depth keying to enable dynamic occlusion and suppress the eventual use of a green stage.

System uses a small camera registration object, such as a board of known size and covered with a known pattern, placed in the scene so that a corner of the detected pattern is treated as the origin for the 3D point cloud (and thus the world).

Camera registration object comprises at least two spheres of known size arranged in a true vertical and recognized using a blob image recognition algorithm.

System includes a magnetometer to indicate magnetic North, an accelerometer to indicate gravity direction (and thus giving true vertical), a gyro to indicate if the system is tilted up/down or has panned left or right or has been rotated about the optical axis, and a 3-axis accelerometer to enable translation in 3D from a start position to be inferred.

Software attempts to generate a uniformly distributed point cloud in the 3D map to greatly reduce tracking losses and increase tracking accuracy (more parallax is generated, so the estimated camera position is more accurate).

The camera tracking system can be wirelessly connected to the camera system and can hence be rapidly moved around the set when generating the 3D point cloud—no need to trail cables over the set, unlike earlier witness camera systems.

The camera tracking system combines real-time surveying of a 3D scene (monoscopic case) or instant survey (stereoscopic case) with tracking of the film camera as the director/cameraman tracks, pans, tilts the camera tracking system attached to the film camera.

System fully automates all aspects of film camera tracking, including rotation, translation, focus, iris, focal length; and automates the scaling, positioning and orientation of the 3D computer generated content to be mixed in with the video.

System enables real-time, continuous surveying of a scene to generate a more complete point cloud defining the scene System attaches rotation invariant descriptors, for example using ORB, to feature points detected in the scene to facilitate recovery of tracking.

System uses a constant velocity model associated with the information provided by the sensors to predict the next position of the film camera using the previously correctly computed or confirmed position. It uses that prediction to re-project the 3D point cloud onto the current frame, to enable a point matching algorithm to match points identified in the real-time video feed from the witness camera system and the projected points in the new, 3D point cloud.

System uses a Levenberg-Marquardt minimization scheme for camera tracking to minimize the error between the points identified in the real-time video feed from the witness camera system and the projected points in the new, 3D point cloud.

The user can use the 3D point cloud generated by the camera tracking system to define 3D masks, such as 3D Garbage Matting masks.

3D objects include static objects, dynamic animations, virtual worlds, virtual people, virtual buildings, virtual scenery, virtual film sets, and any data in an animation database.

The film camera and the witness camera are calibrated for frame acquisition delay using a modulated light source, such as by comparing light intensity curves associated with a flashing LED.

Other Concepts—each can be combined with any of the features defined above, or with any other concept defined below:

A method of mixing or compositing real-time, computer generated 3D objects and a video feed from a film camera in which the body of the film camera can be moved in 3D and sensors in or attached to the camera provide real-time positioning data defining the 3D position and 3D orientation of the camera, or enabling the 3D position to be calculated.

A method for mixing or compositing real-time, computer generated 3D objects and a video feed from a film camera, such as a video camera, to generate augmented reality video for TV broadcast, cinema or video games, in which:
(a) the body of the film camera can be moved in 3D and sensors in or attached directly or indirectly to the film camera provide real-time positioning data defining the 3D position and 3D orientation of the film camera, or enabling the 3D position and 3D orientation of the film camera to be calculated and
(b) that real-time positioning data is then automatically used by the system to create, recall, render or modify computer generated 3D objects and
(c) the resulting computer generated 3D objects are then mixed in or composited with the video feed from the film camera to provide augmented reality video for TV broadcast, cinema or video games.

Methods or systems as defined above and used to enable a director (or a director of photography) to frame-up the pre-production computer generated 3D assets in camera, typically previsualisation or visual effects assets, in real-time onto the live action film plate or video images as captured by the camera, enabling the director to explore possible camera angles and moves in real-time with the computer generated 3D assets being automatically mixed into the video as seen by the director.

Methods or systems as defined above in which the real-time positioning data is recorded and time-code stamped to provide match-move data for post-production processes.

Methods or systems as defined above and used to enable virtual objects or images to be inserted into a broadcast video stream.

Method or system as defined above to enable one or more of the following:
Real-time tracking for studio cameras
Real-time tracking for STEADICAM™
Real-time tracking for Crane-mounted cameras
Real-time tracking for Dolly-mounted cameras
Real time tracking for Oustside Broadcast (OB)
Using real-time data (e.g. tracking data) for 2D post-production
Using real-time data (e.g. tracking data) for post-conversion for 3D stereoscopic content
Using real-time data (e.g. tracking data) for native 3D stereoscopic content
3D graphics insertion
3D graphics insertion for in-studio or on-set product placement
3D graphics insertion for OB
3D graphics insertion for other sponsored images
3D graphics insertion that is viewer-location specific
3D graphics insertion that is viewer-specific
3D graphics insertion that is time-specific
3D graphics insertion for filling out crowd scenes
3D graphics insertion for green screen replacement
3D graphics insertion of educational content to assist learning, in museums and interpretation centres in cultural, historic or natural sites.
Measurement of the absolute or relative size of objects in the scene.

Methods or systems as defined above, where the film camera is one of the following:
All cameras with a standard tether
Cameras requiring tactical optical fibre connection
Camera requiring RF/wireless connection Method or systems as defined above, deployed in one of the following markets:
Film/TV (not live)
Commercial (not live)
Commercials live
Broadcast (not sports)
Broadcast OB
Sports studio based
Sports OB based
TV product placement live
Internet usage (not live)
Internet live
Internet live territory based
Internet product placement live
Museum/heritage content
Museum/heritage advertisements
Architectural
Games Methods or systems as defined above and used to enable augmented reality images to be displayed by any display device, including a smartphone, and augmented reality glasses, the appearance of the augmented reality images being automatically altered in dependence on the real-time positioning data.

A film, movie, TV show or video game in which real-time, computer generated 3D objects are mixed with a video feed from a camera, in which the body of the camera can be moved in 3D and sensors in or attached to the camera provide real-time positioning data defining the 3D position of the camera, or enabling the 3D position to be calculated.

A scene surveying and tracking device adapted to be attached to a conventional camera, in which the body of the camera can be moved in 3D and hardware sensors in the scene surveying and tracking device provide real-time positioning data defining the 3D position of the camera, or enabling the 3D position to be calculated.

A hand-held or portable camera including sensors in or attached to the camera provide real-time positioning data defining the 3D position and 3D orientation of the camera relative to a 3D reference frame, or enabling, fully or as part of a system that analyses other data, such as optical flow data, the 3D position to be calculated.

A film camera including or attached to a stereoscopic witness camera system, the witness camera system generating wide-angle (e.g. 180 degree) stereoscopic images, enabling software to process the images and, without the camera system being tracked/moved at all, to generate an instant 3D point cloud.

A camera tracking system for attaching to a film camera, having the witness camera system generating stereoscopic images, enabling software to process the images and, without the camera system being moved at all, to generate an instant 3D point cloud and provide realtime tracking (position, orientation, zoom, focus and iris) of the film camera.

Augmented reality glasses including sensors in or attached to the glasses provide real-time positioning data defining the 3D position and 3D orientation of the glasses relative to a 3D reference frame, or enabling, fully or as part of a system that analyses other data, such as optical flow data, the 3D position to be calculated.

The present implemented system is called Ncam. Various applications of Ncam include the following:
Visual Effects in Film, TV and Commercials
Visual effects in pre-production and production: Ncam seeks to help fill the gap between the previs (pre-production) and VFX (post-production) during the shooting process (production). Ncam offers a solution to those wishing to frame up on the VFX in-camera, whilst shooting, in real-time. Using previously created content, often from the previs process, Ncam is able to composite those previs assets, normally 3D models and animation, onto the live action film plate in realtime.

Taking the carefully crafted and approved previs onto set can save huge amounts of time. The filmmakers can frame up the previs or VFX, whether it be shooting on greenscreen and compositing a virtual background or overlaying a creature or object in the foreground. The filmmakers are then able to take back control of the previs and VFX exploring possible camera angles and moves on the fly and in realtime, without the usual constraints.

In turn, the data is recorded and time-code stamped, giving the VFX department camera match-move data (the 6 DOF track) whilst at the same time providing editorial with a 'temp' of the final VFX.

By shooting the 'temp' VFX in-camera and by designing the VFX earlier in the process, it's possible to take a lot of the guess work out of the VFX as a post-production process. We can lessen the VFX design process, thus saving wastage.
Virtual Advertising—Live Broadcast Ncam's technology lends itself well to real-time virtual advertising with the broadcast space. Digital product placement, where the product is inserted after the shoot during postproduction, as opposed to a real physical product being in-camera, is becoming more popular. However, with the ability to augment the digital product placement live, we are able to open up various possibilities. Examples may include branding logos on sports fields or canned drinks in a soap opera. This is where the ability to render photo-real CG images, in real-time, based on the shooting environments lighting, becomes critical.
Holographic Gaming Combining Ncam's technology with holographic displays and eye-wear (such as Google Glass) could provide a totally immersive gaming experience. Blending the real world with virtual worlds and characters. The possibilities are somewhat endless.
Museum & Heritage Ncam's technology offers a wide range of potential applications to the museum and heritage sectors.

As an exploratory tool it could be useful for the reconstruction of heritage sites such as ruins, showing what the site looked like in its former glory.

Within museums Ncam may be used as an educational tool, perhaps to demonstrate a dinosaur's size and movement, it's internal organs or skeletal structure. Another example may be to explore the workings of the integral combustion engine, effectively viewing an exploded animated diagram, but in full immersive 3D space.
Virtual Camera—VCS Ncam technology lends itself perfectly for this application. A virtual camera is essentially an LCD screen showing a complete CG 3D environment. As the operator moves the LCD screen, it behaves just like a physical camera in terms of movement. The LCD camera is tracked in XYZ translations and rotations and shows the full CG environment from a CG engine, in real-time. There are currently various VCS (virtual camera system) solutions available, but all have limitations in terms of the technology. They tend to be time consuming to setup, limited in the space and environment in which they will operate, and are expensive. A Ncam based VCS would likely take the shape of a tablet, whereby the processing would be calculated locally combined with an LCD screen. The CG computations could be taken from a remote PC or possibly locally depending on requirements.

The idea is to enable open access through usability and price points to lots of departments within a film, who previously have been unable to have access to such tools. This is very useful for designers, architects, VFX, games companies, CG and animation houses etc.

This VCS would also form the backbone to the potential museum and heritage solution.
Virtual Scout System—VSS If you imagine you're shooting a movie and it's predominantly on bluescreen/greenscreen. How, as a filmmaker or director, do I work out which angles or shots will be the best? After all, I may have a small amount of physical set and a few actors, but I have little idea, apart from my imagination, of which camera angles are best, let alone explain to the entire crew where we should set up the cameras and make a valid choice of lenses. Currently we would move a film camera and all its paraphernalia to a location on the set, setup Ncam and take a look, only to realise it would be better in another position. If only we had a lightweight portable system to make those decisions, quickly and efficiently. This is Ncam VSS.

VSS is Ncam as it is today, but integrated into a small form factor camera—think DSLR. It is essentially a digital viewfinder with the benefits of Ncam. We are combining all the elements of Ncam as it is today, on a film set, but in a portable device. Virtual production for TV episodic would also benefit hugely from this tool, as would museum/heritage sites as well as architects wishing to show potential investors their new creations.

DETAILED DESCRIPTION OF THE INVENTION

This technology is about mixing real-time computer-generated 3D objects and real-life video feed coming from a real camera (called film camera for the remaining of this paper) on a film set, TV broadcast or video game. The main objectives of this system are:

- To provide a real-time framing tool of virtual characters and environment for movie directors.
- To display in real-time the photo-realistic result of the virtual objects directly merged with the real video.
- To provide an accurate estimation of the position of a film camera (called camera tracking) for both on-set shooting and movie post-production. All film cameras are handled: crane cameras, steady cam, hand-held camera, cameras on tripods, etc.
- To provide an approximation of the 3D geometrical modeling of the real scene, handling occlusion between the real objects (and/or actors) and the virtual environment (3D objects, characters, etc.).

The technology described here is first of all a powerful sensor fusion algorithm, thus merging natural markers (i.e. not manually added to the physical scene) computed from the 3 (stereoscopic case) or 2 (monoscopic case) different optical flows and the physical measurement of 4 other sensors (gyroscop, accelerometer, magnetometer, 3D range sensor. It is also a totally non-intrusive system which does not require to manually add any physical markers or anything directly visible in the real scene to do its job.

1 Hardware

The technology has 2 different possible hardware configurations depending on the kind of data that have to be streamed out.

Figure 8:
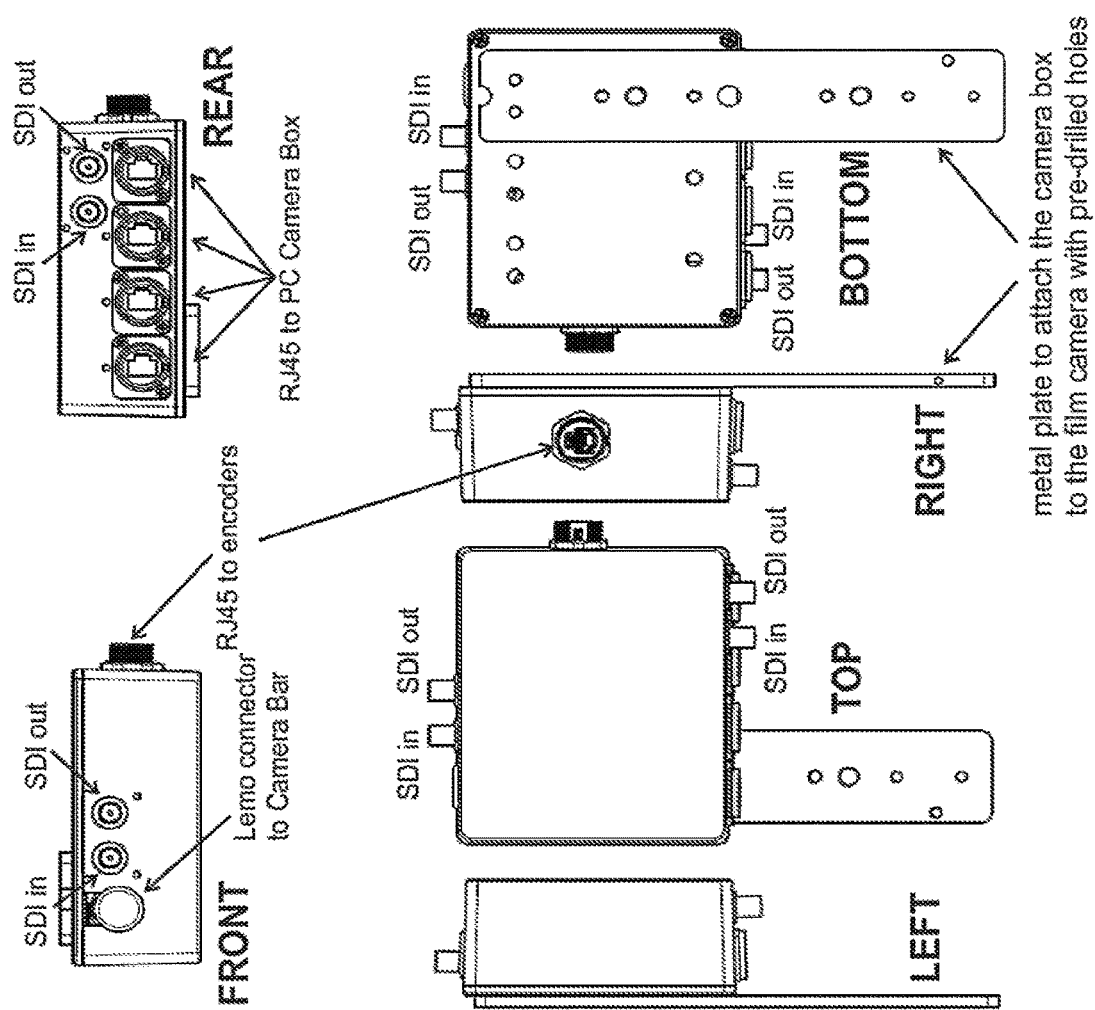
FIG. 8—The Camera/Computer Breakout Box. Note that the version using multiple RJ45 cables is shown here. All these breakout boxes also have a variant where those cables are replaced by a single tactical optical fiber cable.

All these 2 configurations have in common the following hardware mounted on a device called the camera bar (see FIG. 6 for detailed schematics), as well as a separate connection box which is essentially a breakout box merging or separating all the different cables into one or several independent looms (see FIG. 8 for detailed schematics):

- One or two high speed cameras (at least 100 fps), called witness cameras, depending on the selected approach (monoscopic or stereoscopic).
- Each witness camera has a 180 degrees fish-eye lens mounted on.
- A 9-DOF sensor, including a gyroscop, magnetometer and accelerometer (or 6-DOF when the magnetometer cannot be used).
- A 3D range sensor that captures the depth of a pixel.

Figure 7:
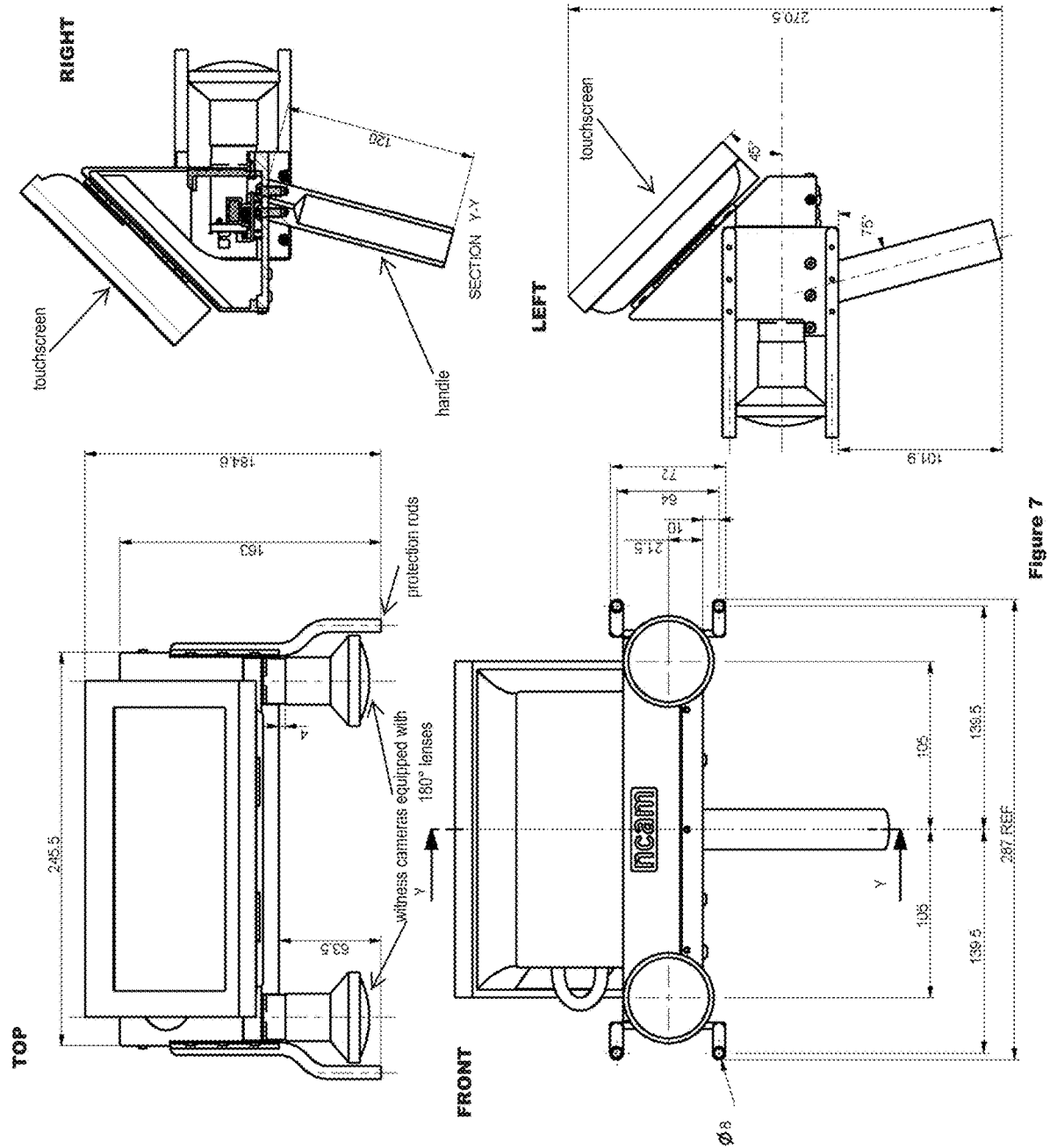
FIG. 7—The wireless survey device. When a survey is required (i.e. monoscopic case for example (see section 2.1, or very complex sets (see end of section 2.1.3)), the whole tracking process is then achieved using that survey device. When the survey is complete, all the tracking data (point cloud, keypoints, etc.) are wirelessly transmitted to the Tracking/Rendering Workstation that instantly recovers the tracking and starts streaming out both tracking data and final composited result.

In addition to the camera bar, all the configurations have regular lens encoders mounted on the film camera to read the zoom, focus and iris values. They also have in common a wireless survey device (see FIG. 7 for detailed schematics) to survey the scene and learn it. However, note that in the case of a full stereoscopic approach (see section 2.5), and more precisely an instant survey (see section 2.5.1), that survey device is not needed.

Apart from these shared features, the 2 configurations are described as follows:

Configuration 1: Camera Streaming

1. Wireless embedded computer:
   (a) An Embedded Tracking Computer is mounted on the film camera. It wireless streams out the film camera translation and rotation (RT) to an external rendering workstation, as well as the zoom, focus and iris (ZFI) that come from the encoders.
   (b) An External Content Generating Workstation. This machine typically runs a computer graphics software to provide 3D computer generated animation and relevant CG content for the final compositing. It also streams out the animated data to the external rendering workstation (1-1c).
   (c) An External Rendering Workstation that on one hand receives the data from the embedded computer (1-1a), and on the other hand also handles the animated data coming from the content generating workstation (1-1b). This rendering workstation uses the film camera RT+ZFI coming from 1-1a to display the 3D virtual environment coming from 1-1b, and mixes the result within the real video flow coming from the film camera. It also streams the final composited result back to the film camera eyepiece or a control monitor without any wire.
2. Wired embedded computer
   (a) An Embedded Tracking Computer is mounted on the film camera. It streams out the film camera translation, rotation (RT) and the encoder data (ZFI) to an external rendering workstation using tactical optical fiber cables.
   (b) Similar as Configuration 1-1b.
   (c) Similar as Configuration 1-1c, except that the final composited result is sent back to the camera through an HD-SDI cable.

Configuration 2: Total Streaming

1. Wireless embedded computer:
   (a) An embedded tracking computer is mounted on the film camera. No actual processing in achieved on that unit. It only wireless streams out all the sensor data to an external tracking workstation. 2× video flows of the witness cameras, 1×9DOF data, 1× range sensor data are streamed out. The total amount of data requires a minimum bandwidth greater than 142 MB/sec sec (witness cameras require 63 MB/sec, range sensor 74 MB/sec, 9DOF sensor 4.4 MB/sec).
   (b) An External Tracking Workstation that receives the data from the embedded tracking computer. This unit processes all the sensor data to compute the rotation and translation matrices of the film camera. It streams out the Camera RT+ZFI to the external rendering workstation (2-1d).
   (c) An external Content Generating Workstation. This machine typically runs a computer graphics software to provide 3D computer generated animation and relevant CG content for the final compositing. It also streams out the animated data to the external rendering workstation (2-1d).
   (d) An External Rendering Workstation that on one hand receives the data from the embedded computer (2-1b), and on the other hand also handles the animated data coming from the content generating workstation (2-1c). This rendering workstation uses the film camera RT+ZFI coming from 2-1b to display the 3D virtual environment coming from 2-1c, and mixes the result within the real video flow coming from the film camera. It also streams the final composited result back to the film camera eyepiece or a control monitor without any wire.

Figure 1:
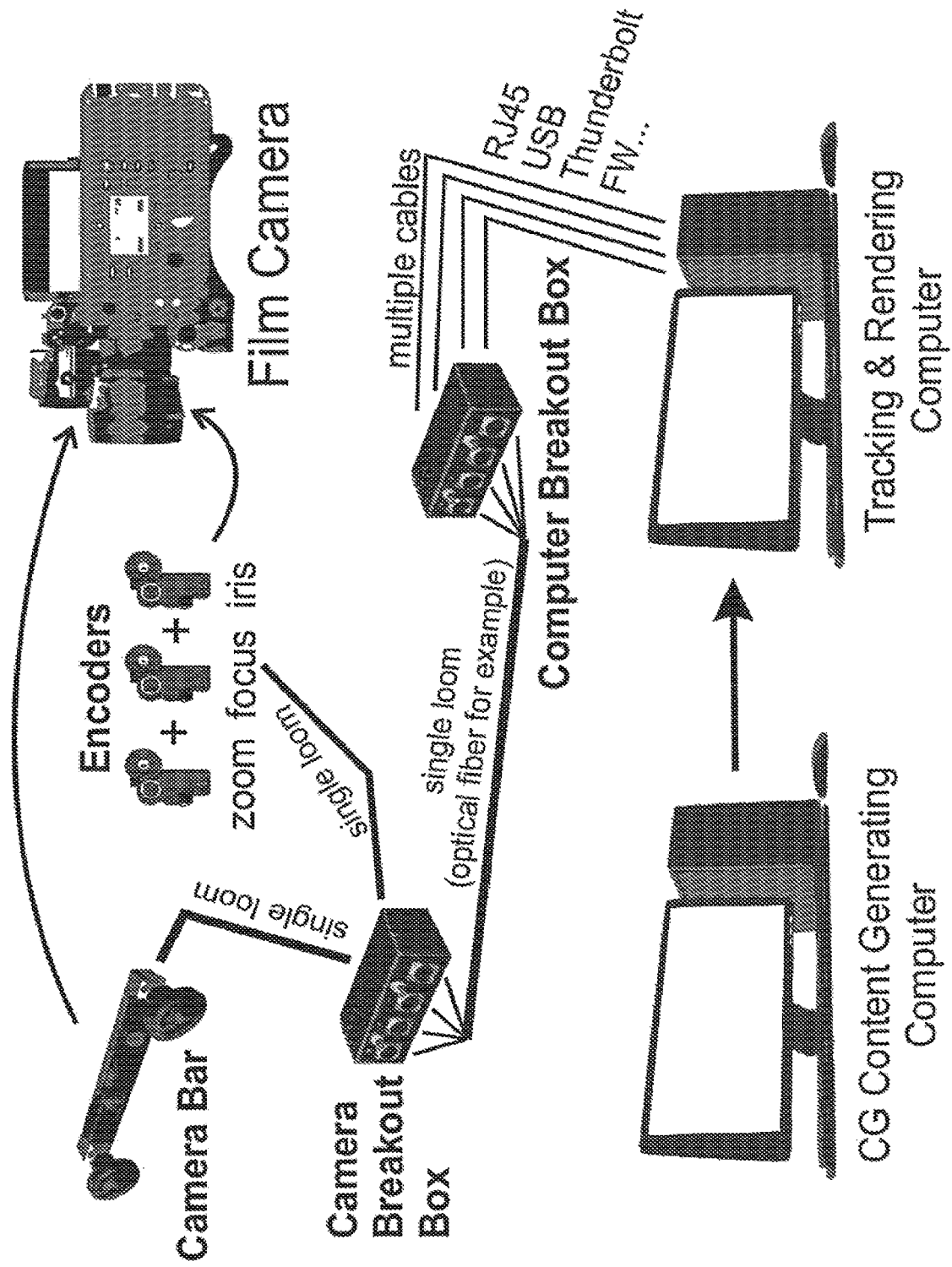
FIG. 1—Hardware description for configuration 2.3. Note that the version drawn here is the one having the tracking workstation and the rendering workstation merged.

2. Wired embedded computer:
   (a) An embedded tracking computer is mounted on the film camera. It streams out the film camera translation and rotation (RT) to an external rendering workstation (2-2c) using tactical optical fiber cables or multiple Cat-6 RJ45 cables. Encoders are used again for zoom, focus and iris (ZFI).
   (b) Similar as Configuration 2-1c.
   (c) Similar as Configuration 2-1d, except that the final composited result is sent back to the camera through an HD-SDI cable.
3. No embedded computer (see FIG. 1 for a graphical illustration: all other versions can be easily derived from that one):
   (a) A single camera tracking device (camera bar) is attached to the film camera, and connected to the breakout box.
   (b) An external tracking workstation that receives the data from the embedded tracking device. This unit processes all the sensor data to compute the rotation and translation matrices of the film camera. Encoders are used again for zoom, focus and iris (ZFI). It streams out the Camera RT+ZFI, to a rendering workstation 2-3d.
   (c) Similar as Configuration 2-1c.
   (d) Similar as Configuration 2-1d, except that the final composited result is sent back to the camera through an HD-SDI cable.

In addition to the previous configurations, every version also has two others variants. One has the Content Generating Workstation actually merged with the External Rendering Workstation, and the second variant has the External Rendering Workstation merged with the Tracking Workstation.

2 Software

Several new scientific methods and softwares have been created to achieve accurate tracking results and real-time augmented reality [19]. These methods are described in the next sections.

2.1 Monoscopic Markerless Tracking from Video Feed 2.1.1 Process Overview

The monoscopic technique used in the technology is built on two separate passes which are actually technically almost the same, except that one requires a user interaction whereas the other is completely automatic.

The first pass is called a survey. A user utilizes a device built on the hardware described in the second paragraph of section 1 (see also FIG. 7) to scan the real scene and the registration object. During that phase, natural markers are automatically learned and computed in 3D by the system as the user scans the environment walking around. As soon as the user has started to do the survey, he has to also capture the registration object (see section 2.1.3.2) in order to automatically estimate the scale, origin and orientation of the world. Once this has been achieved, the user can continue scanning the rest of the scene to build the best possible 3D point cloud of natural markers (a natural marker is a feature point invisible to the human eye and which is computed by our algorithms). The more thorough this survey is achieved, the better the final result will be. The survey part is the most important task of all and it is highly critical.

The second pass is the film camera tracking (see section 2.1.4) which is done from the tracking device which has been put onto the film camera. Different configurations apply, following the description of the previous section entitled "Hardware" and according to various situations. This step is fully automatic and usually does not require any human interaction.

2.1.2 Algorithm Overview

The technology described here is an augmented reality framework based on a multiple sensors fusion technique (see section 2.3).

Indeed, it does not rely on the usual sole optical flow data to track a camera and insert a virtual object. Such techniques have demonstrated their scientific and practical limitations in many cases. For example, if a user hides the camera used for tracking, then the tracking fails and gets lost. It is the exact same problem if the camera points out to a region which has not been surveyed (see section 2.1.3). Moreover, even if the film camera is not moving at all, there are still some inevitable slight wobbling issues due to accuracy of the detected natural markers computed by the pure visual tracking algorithm. Filtering the data partially solves the issue but you never get a perfectly stable virtual object especially when using very long focal lens. As our technology uses other sensors to know if the camera is moving or not, our tracking algorithm does not have that issue.

Regular optical flow techniques like SLAM[9], PTAM[8], RSLAM[13], etc. use informations contained in the video captured by the camera to approximate its position and orientation. Our technology has a similar approach for its visual tracking part (called visual tracking), except that on one hand the core of the tracking is not a simple keyframe search when it gets lost, and on the second hand it uses all the data of the 7 available sensors (one film camera, two witness cameras, a gyroscop, an accelerometer, a magnetometer and a 3D range sensor) to compute an accurate position and orientation of the camera.

We use an Extended Kalman Filter (EKF, see section 2.3.2) [7, 21] to integrate the following sensors: gyroscop, accelerometer, magnetometer sensors and witness cameras. The EKF technique is the heart of our software and all the prediction/correction algorithm is based on a data merging method allowing to use the best of each sensor. This provides an unrivaled robustness to simple and critical cases where all other techniques fail. Indeed when a sensor has lost the track (actually meaning that its measurements are not reliable anymore), the EKF is still able to obtain an estimation of the position/orientation by merging the data of the other reliable and remaining sensors. In addition to that, as every sensor has level of confidence, this impacts on the merging algorithm in order to prevent the system from using inaccurate informations. For example, a regular gyroscop has a natural flaw called the drift which tends to modify its orientation even when it is not moving. The more time goes the more error is generated by the gyroscop. The drift correction of the gyroscop is done by using the visual tracking, and the visual tracking is corrected by the gyroscop when its error becomes too big. The EKF is thus able to find the best position and rotation of the Film Camera by predicting the movements of the Film Camera using the previous correctly estimated values, and then correcting its prediction according to the new measurements given by all the sensors.

Furthermore, most pure optical-based tracking techniques use keyframe (i.e. snapshots) to locate the camera when it gets lost. If you have no keyframe of the current view you are pointing at with the camera, then the recovery fails. More robust techniques are of course usable like SIFT[11] or SURF[1] techniques to solve cases where you have simply vertically rotated the camera for example. Indeed as all these systems compare the current frame to the most similar keyframe, it is quite interesting to use rotation and scaling invariant descriptors to obtain a better and faster matching. However, if you don't have any keyframe from the position where the camera is, there is no way your system could recover its position. Our technique takes the very best of every technique (note that we use ORB[18] as keypoint descriptors), and we simultaneously run three different threads to recover the lost tracking (see section 2.1.4.4 for more details). The recovery process can be seen a global algorithm based on a probabilistic and stochastic approach. When the tracking gets lost, the 3D space is instantly sampled around the latest known positions using a ellipsoidal approach and all keyframes inside that ellipsoid are compared to the current keyframe. Moreover, all other data coming from the remaining sensors (gyroscop, accelerometer, magnetometer, 3D range sensor) are still merged in the search allowing our software to disambiguate all the plausible good candidates. Of course, if no keyframe is a good enough candidate, then the system will use all others sensors apart from the visual tracking one to compute an approximation of the current position. The obvious consequence of that technique is that our technology allows the user to point the camera to a place that has not been surveyed without losing the tracking. However our algorithms never stop sampling the 3D space to find a keyframe (i.e. better approximation of RT) that matches the current snapshot. If a visual tracking is recovered, all other sensor data are used and updated to correct their own informations in addition to the camera ones (see Extended Kalman Filter, section 2.3.2).

Figure 4:
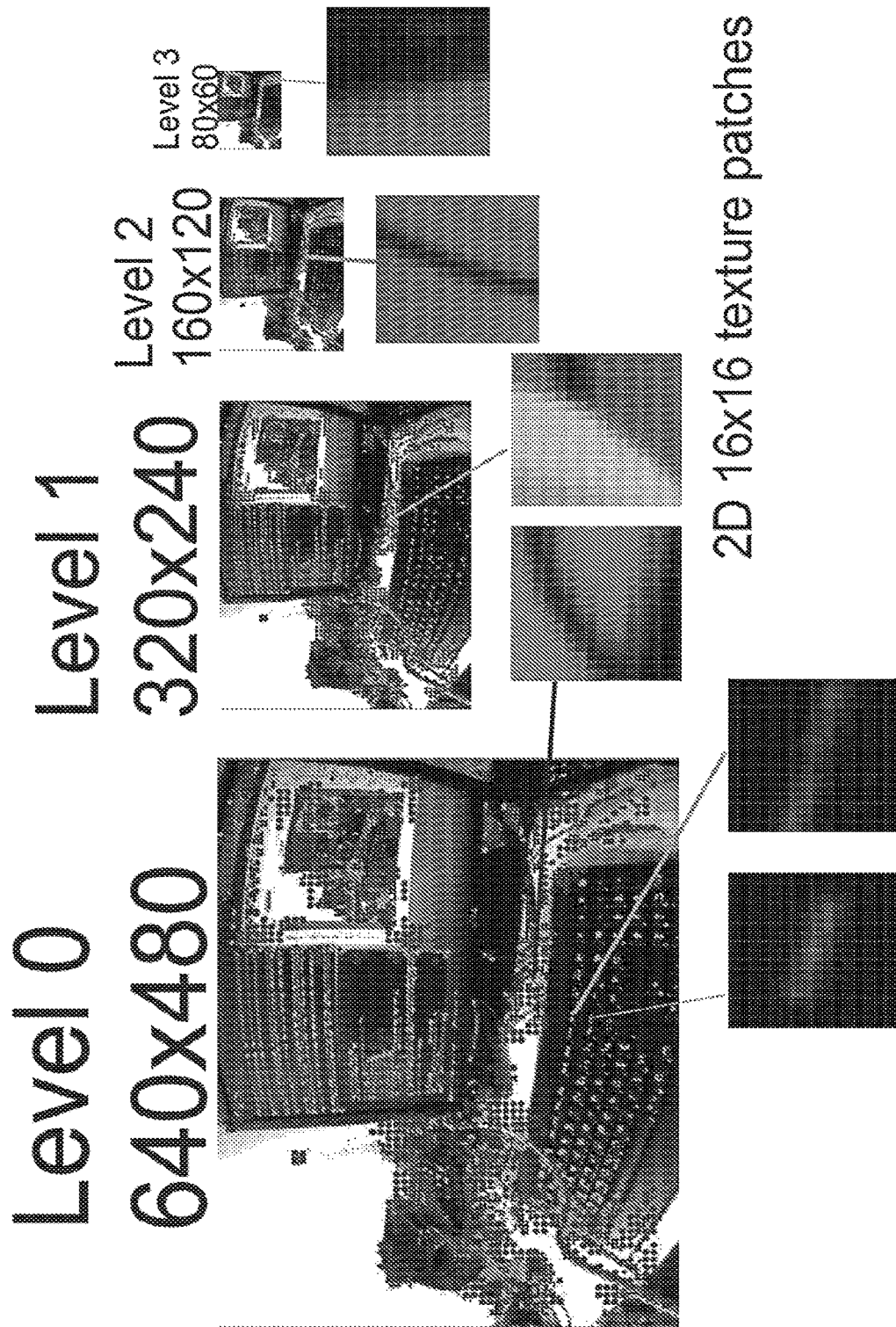
FIG. 4—The Image Pyramid used for the detection of natural markers. This figure also shows some 2D texture patches associated to the markers.
Figure 6:
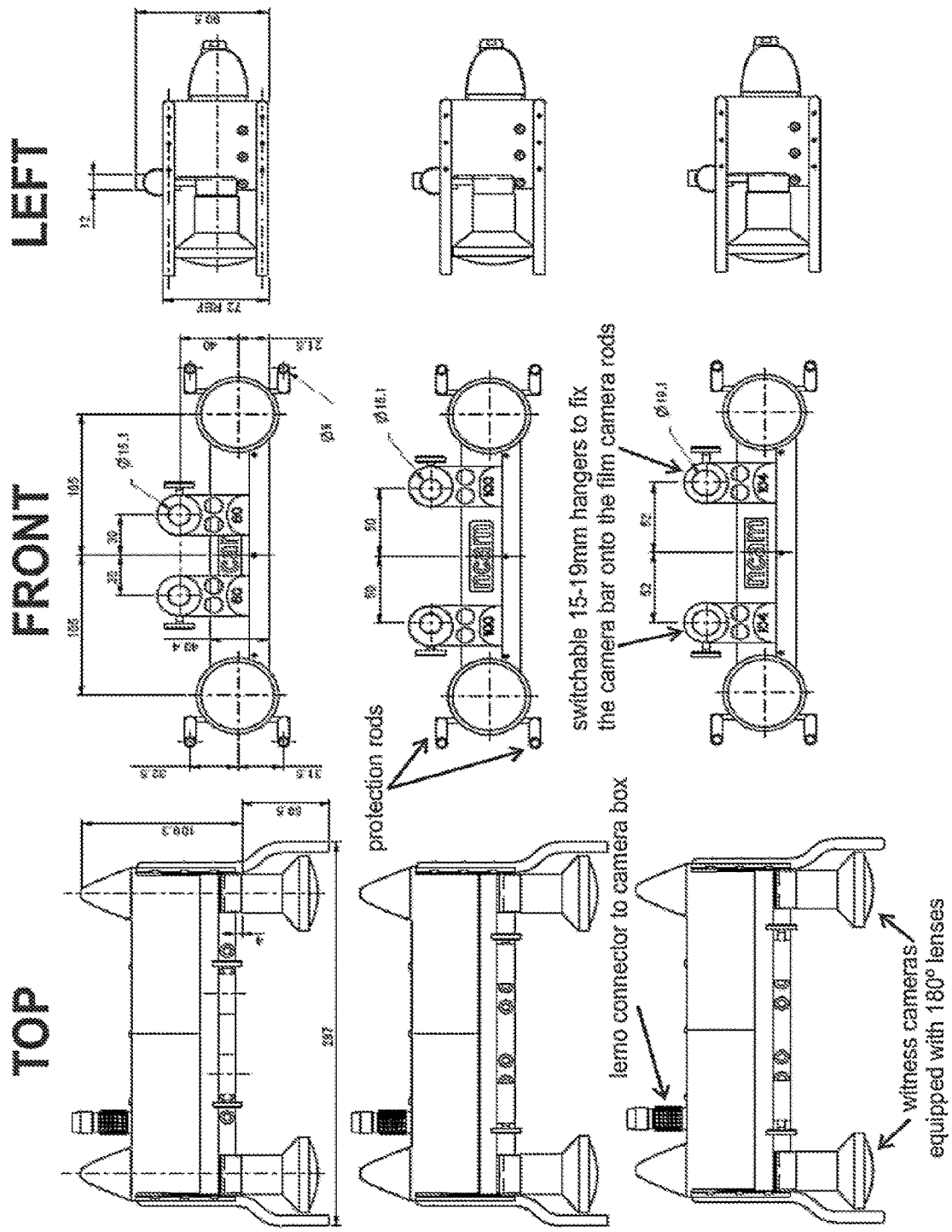
FIG. 6—The Camera Bar to be mounted on a Film Camera with the different hanger sizes (for 15 mm and 19 mm rods).

The latest (i.e. regular) version of our technology is stereoscopic (see section 2.5) meaning that it uses two witness cameras spaced out by 21 centimeters (see FIG. 6). This technology does not require any computation of a homography or any manual translation of a single witness camera (see section 2.1.3) to compute the depth information of natural markers detected in the video feed. This method simplifies our main algorithm by making the survey phase obsolete in most cases (see section 2.5). As in the monoscopic technique, the visual tracking itself has a complete sub-pixel approach allowing the system to track the position at the camera at 4 different levels of an image pyramid (see FIG. 4) whereas all other optical-flow based technologies wrongfully use a pixel approach on only two different resolutions of images when searching for feature points.

2.1.3 $1^{st}$ Phase: The Survey 2.1.3.1 Initialization Step

The first step is for the user to do a physical/manual horizontal translation with the device in order to capture two frames. The algorithm auto-detects natural markers (i.e. feature points) in the images by using a corner detection method called FASTER[17]. A matching is applied to find the correspondence between pair of points. For one image, all the detected points must remain on the same 3D plane to be able to compute a correct homography from that plane to the picture. This gives a rotation and translation of the camera regarding the 3D plane. The second picture follows the same principle and we obtain a second position and translation of the camera for the current picture. It is now possible to compute the transformation from one camera to the other and obtain a first 3D point cloud.

Let's consider two views (Left and Right) captured by a camera. For each view the witness camera was targeting at a point M being on a plane. $M^L$ and $M^R$ are the perspective projections of M in left and right views respectively.

We can write:

$$M^L = H \cdot M^R \quad (1)$$

$$H = (D \cdot R + \vec{T} \cdot \vec{N}^t) \quad (2)$$

where:
R is the rotation matrix by which $M^L$ is rotated in relation to $M^R$.
$\vec{N}(A, B, C)$ is the normal vector to the plane which the point M belongs to.
D is the distance to the plane such as Ax+By+Cz+D=0.
Solving for H in equation 1 yields to:

$$H = \begin{Bmatrix} x_{M^L} & 0 \\ y_{M^L} & 0 \\ 1 & 0 \\ 0 & x_{M^L} \\ 0 & y_{M^L} \\ 0 & 1 \\ -x_{M^L} * x_{M^R} & -x_{M^L} * y_{M^R} \\ -y_{M^L} * x_{M^R} & -y_{M^L} * y_{M^R} \\ -x_{M^R} & -y_{M^R} \end{Bmatrix}^t$$

Our algorithm requires a minimum of 4 coplanar points to do a correct initialization. It is quite usual that we actually have much more points than that. That is why we compute n possible homographies using 4 points among the whole set of points for every homography. We then use a RANSAC[4] method to actually find the best possible homography and build a set of inliers and outliers candidates. Outliers will be rejected whereas inliers will be refined by a Gauss-Newton method minimizing the errors of reprojection of the points in the two views. Having the best homography computed from the filtered set of points, it is now necessary to estimate the rotation and translation matrices between left and right views. This is easily achieved by using the singular value decomposition into two orthogonal matrices U, V and a diagonal matrix $\Upsilon$. Matrix H can now be written as: $H = U \Upsilon V^t$.

$$\Upsilon = (D' \cdot R' + T' \cdot N'^t) \quad (3)$$

with:

$R = \det(U) \cdot \det(V) \cdot U \cdot R' \cdot V^t$ $T = U \cdot T'$ $N = V \cdot N'$ $D = \det(U) \cdot \det(V) \cdot D'$ As we do not handle undetermined homography cases, Equation 3 has two possible solutions:

Solution 1:

$$T' = (\lambda_1 - \lambda_3) \begin{pmatrix} \varepsilon_1 \sqrt{\dfrac{\lambda_1^2 - \lambda_2^2}{\lambda_1^2 - \lambda_3^2}} \\ 0 \\ -\varepsilon_3 \sqrt{\dfrac{\lambda_2^2 - \lambda_3^2}{\lambda_1^2 - \lambda_3^2}} \end{pmatrix} \quad (4)$$

$$R' = \begin{pmatrix} \cos\theta & 0 & -\sin\theta \\ 0 & 1 & 0 \\ \sin\theta & 0 & \cos\theta \end{pmatrix} \quad (5)$$

with $$\begin{cases} \cos\theta = \dfrac{(\lambda_2^2 + \lambda_1\lambda_3)}{\Lambda} \\ \sin\theta = (\lambda_1 - \lambda_3)\cdot\varepsilon_1\varepsilon_3 \dfrac{\sqrt{(\lambda_1^2 - \lambda_2^2)(\lambda_2^2 - \lambda_3^2)}}{\Lambda} \\ \Lambda = \lambda_2(\lambda_1 + \lambda_3) \end{cases}$$

$\lambda_1$, $\lambda_2$ and $\lambda_3$ are the eigenvalues of matrix H from equation 2, and sorted such as $\lambda_1$ $\lambda_2$ $\lambda_3$ and $\lambda_1 \neq \lambda_2 \neq \lambda_3$.

Solution 2:

$$T' = (\lambda_1 + \lambda_3) \begin{pmatrix} \varepsilon_1 \sqrt{\dfrac{\lambda_1^2 - \lambda_2^2}{\lambda_1^2 - \lambda_3^2}} \\ 0 \\ \varepsilon_3 \sqrt{\dfrac{\lambda_2^2 - \lambda_3^2}{\lambda_1^2 - \lambda_3^2}} \end{pmatrix} \quad (6)$$

$$R' = \begin{pmatrix} \cos\varphi & 0 & \sin\varphi \\ 0 & -1 & 0 \\ \sin\varphi & 0 & -\cos\varphi \end{pmatrix} \quad (7)$$

with $$\begin{cases} \cos\varphi = \dfrac{(\lambda_1\lambda_3 - \lambda_2^2)}{\Lambda} \\ \sin\varphi = \varepsilon_1\varepsilon_3 \dfrac{\sqrt{(\lambda_1^2 - \lambda_2^2)(\lambda_2^2 - \lambda_3^2)}}{\Lambda} \\ \Lambda = \lambda_2(\lambda_1 - \lambda3) \end{cases}$$

$\lambda_1$, $\lambda_2$ and $\lambda_3$ are the eigenvalues of matrix H from equation 2, and sorted such as $\lambda_1$ $\lambda_2$ $\lambda_3$ and $\lambda_1 \neq \lambda_2 \neq \lambda_3$.

In addition to the set of features points, the algorithm also captures two key positions as snapshots of what the witness cameras sees from every viewpoint. The learning of additional points is always a sum of three components: new detected points, key positions and patches, which are described section 2.1.3.3.

Finally, note that in the case of a stereoscopic approach (see section 2.5), the survey phase becomes automatic and instant. A manual survey might still be used for extremely complex cases (experimentally decided on set) but this remains anecdotal.

2.1.3.2 Automatic Scale, Origin and Orientation of the 3D World

During a monoscopic survey, it is not possible to compute an accurate origin, scale and orientation of the world as this would either require the prior knowledge of a real object including its exact shape and dimensions, or the distance used between the two views for computing the homography. Note that in that last case, this would not give you the origin or the orientation of the world anyway. Most systems do not take that part into account. They often ask the user to do the scale manually by entering the dimensions of a 3D object visible in the videos. Other options are for the user to scale the 3D virtual characters within a specific modeling/animation software during the shoot and also properly aligning it with the real world. However, any scale error—even small—has dramatic impacts onto the quality of the final compositing and that is why it is so carefully achieved in our technology (see below). One of the most common observed consequences of a bad scaling is a feeling for the user that virtual objects are sliding on the ground, instead of remaining perfectly attached to it.

We propose a new method which requires to put a proprietary registration object in the scene when doing the survey. This object is automatically detected because it has a very well-known shape, and all its dimensions are also known. No user interaction is required at all.

Figure 3:
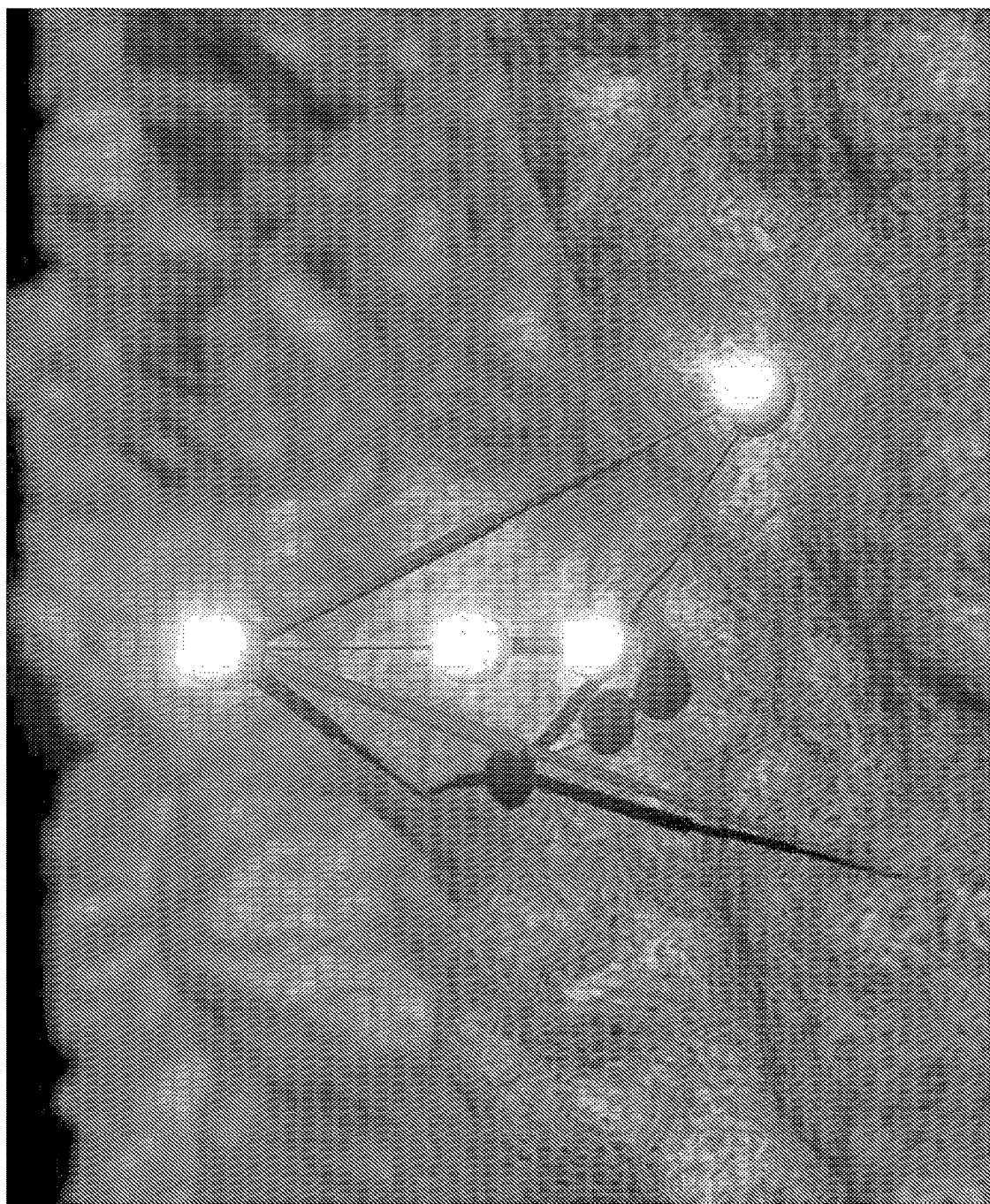
FIG. 3—The 3D auto-leveling Registration Object created for our system. That object is used in the real scene to automatically compute the origin, the orientation and the size of the real-world in our software. A planar version is shown on the right picture of FIG. 5.
Figure 5:
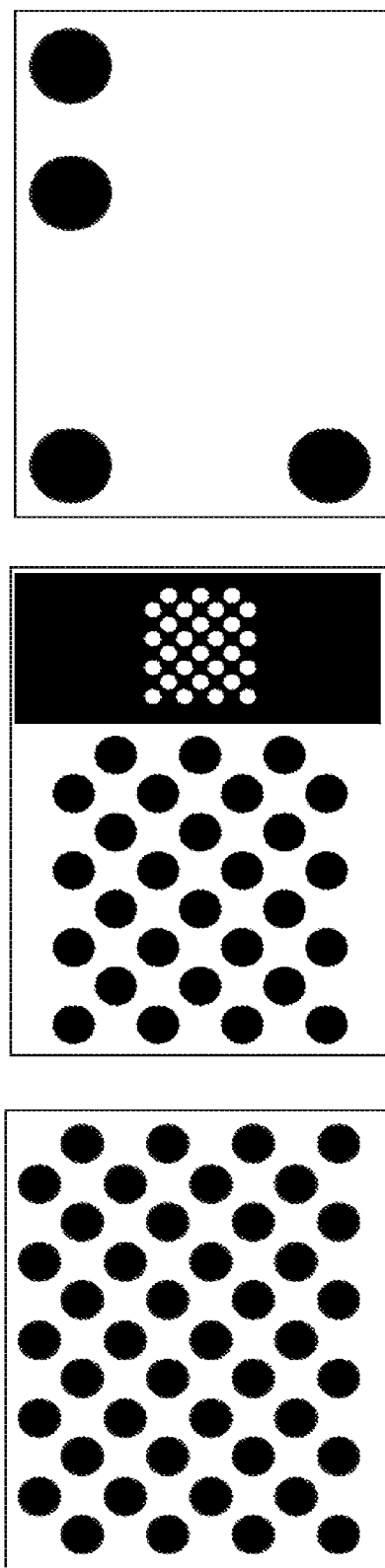
FIG. 5—Calibration charts developed and used in Ncam. Left: calibration chart used to calibrate all lenses. Middle: Calibration chart used or a lineup computing between a film camera and a witness camera. The chart on the left might also be used for cases where the focal length on the film camera is short enough (experimentally decided on set). Right: planar version of the registration object. Easier to handle and can be placed anywhere on the ground surface. The circles give an orthonormal basis giving the world orientation, scale and origin (0,0,0) when adding virtual objects to the real scene. The center of the top left circle is the origin of the world.

Our registration object is made of several parts which are essentially spheres and legs as shown in FIG. 3. The spheres are crucial parts of that object in our system, as they allow to use blob detection algorithms to recognize the pattern through the video. The gravity centers of the projected spheres (i.e. circles) are then computed and as we accurately know the dimensions and the distance between every sphere, the system is able to give a very precise scale for the world. We also have a planar version of the registration object (see right picture of FIG. 5), which is often more convenient to move from a place to another on a real stage.

Once this has been achieved, a user is able for example to put a 1.80 m tall virtual object into the real video and ensures it will really look that tall and correct. Other approaches fail to obtain such a quality because of the manual aspect of the task.

The automatic scaling is actually something which is done during the survey itself, but as it happens at the beginning of the survey, it is important to consider it as an initialization step too. The computed scale is indeed used in the following steps of the survey to build an accurate set of 3D natural markers. Let's see now in details the survey itself.

2.1.3.3 Survey Process and Point Cloud Construction

The survey requires the user to move through the scene using the survey device. As the system always computes new points according to the confidence it has in the previously learned ones, the survey is always built in a way that the witness camera sees enough points from the previous set to add new candidates.

During the witness camera movements, the algorithm creates a map made of three sets of data learned in the 4 different levels of an image pyramid (see FIG. 4):

A key position. A key position contains a snapshot at 4 different resolutions of what the witness camera sees. The lower level of the pyramid is the original resolution of the witness camera (640×480 in our case). That key position is also used by the algorithm to recover the camera position when the tracking is getting wrong.

A set of 2D feature points estimated by FASTER[17] in every images of the key position. FASTER is a very well-known algorithm whose main feature is to be a corner detector algorithm. Every keypoint has also an attached ORB descriptor to ensure a much faster recovery when losing the tracking (see section 2.1.4.4).

A set of patches (16×16 2D textures) centered on every feature point detected by the previous step. During the detection of new points, there is no way starting from a single view to compute their depth. That is what the patches are useful for. An epipolar search (see FIG. 2, Point Cloud Builder rectangle) can be applied through the 4 images of the key positions by finding a correspondence between two patches into two as close as possible key positions. Once a point (i.e. a patch) has been detected in both views, it is then possible to compute a 3D feature point. The set of 3D feature point is called a Map. It is important to also understand that this search between to key position A and B is achieved by traversing equal levels of pyramid A and B but also B's pyramid sub-level (sec FIG. 4).

During the construction of the map, the camera moves according to the displacement of the survey operator. At this time, our software only knows the parameters of the camera that were previously computed (i.e. tracked). In order to compute the new position of the camera, we need the current frame and the 3D point cloud of natural markers. On one hand, FASTER computes a set of 2D markers at several levels of the image pyramid (current level and current level+1), and on the other hand the 3D point cloud is reprojected onto the current frame. This last step can only be achieved if we know the position of the camera as the points are being reprojected from its viewpoint. But that is precisely what we are trying to compute. Therefore our software uses a constant velocity model associated to the information provided by our 9-DOF sensor (see section 2.3) to predict the next position of the camera using the previously correctly computed position. Using that prediction, the 3D point cloud can be reprojected onto the current frame and a point matching algorithm is applied to find a correspondence between the 2D points that were detected by FASTER and the projected points of the 3D point cloud. The error between the two sets of markers is minimized using a Levenberg-Marquardt[10, 12, 15] algorithm as it is known to be the best optimization algorithm for that kind of problems. If the number of matched points divided by the total number of projected points is greater than a given threshold, the system is able to successfully track the camera (the tracking is good) and is allowed to add new key positions. The 2D points detected by FASTER that did not find a match in the 3D point cloud are stored in the memory for later user, as well as their related 2D 16×16 texture patches. They will be required to generate new 3D feature points (see next paragraph).

New key positions (and new feature points) are added if 3 conditions are fulfilled. First, as we said in the previous paragraph, the tracking must be good meaning that it is accurate enough or not lost. Second, the key position is added every 30 frames (1 per second) to avoid building a too huge set of data. Third, the new key position must be at a minimum distance of 10 cm from the closest key position. This prevents the system from learning additional points when being stationary.

When all these tests have successfully passed, the software can add a new snapshot and new 3D feature points. The first step is to use FASTER again to detect new relevant 2D points in the new frame (snapshot). As we have a set of unmatched 2D feature points coming from the track, we now try to match the "old" 2D feature point set and the newly computed one. This is done by a classical epipolar search using the 2D texture patches of the new set of points. The patches are moved along the epipolar lines (see FIG. 2) trying to match the set of 2D patches of the "old" set of points. Thanks to the epipolar constraint, it is possible to compute the depth of the 3D point coming from the matching of two 2D points. This is actually similar to the matching step of the homography phase (see section 2). If new points have been added to the map, a local bundle adjustment is applied. After having refined the position and rotation of the camera using these new feature points, a Levenberg-Marquardt minimization algorithm is used to refine the 3D position of all feature points. This is done on a k+1 frames window, meaning that the minimization takes into account the current snapshot plus the k closest ones to properly estimate the current position and rotation of the camera (local bundle adjustment). The value of k can be either empirically determined or be adaptively computed according to a given error threshold for the minimization algorithm.

In addition to the local bundle adjustment, a global bundle adjustment is also applied on all existing key positions. As the set of key positions gets bigger and bigger across time, the system takes more and more time to do the global adjustment. If new key positions are being added and our software did not have enough time to do the local and/or global bundle adjustments, the adjustments are then just canceled to leave the priority to the addition of new key positions. They will be applied again as soon as the addition of new key positions is achieved.

Once there is an existing point cloud, the camera can be tracked. This is described in the next section.

2.1.4 $2^{nd}$ Phase: Film Camera Tracking 2.1.4.1 Geometric Camera Calibration

The camera calibration has several goals. On one hand it gives us a mathematical relation to describe how the image is created on the sensor. On the second hand it computes a transformation matrix between the 3D points and their projection onto the image plane of the camera.

This important prerequisite of the survey and tracking process means that we have to compute two different kind of properties: the intrinsic and extrinsic parameters. The intrinsic parameters are related to the camera and lens properties and move accordingly to the way they have been physically built. They encompass the image format, the distance between the optical center of the camera and the image plane, and the principal point. The image format is made of two scale factors relating pixels to distance. The principal point is the projection of the optical center onto the image plane (being ideally in the middle of the image). In addition to that, some lenses require to have their optical distortion being computed and taken into account for the tracking. During a calibration process, a planar surface having several circular patterns are successively captured by the camera (see FIG. 5). For all positions, the extrinsic parameters (i.e. position and the rotation of the camera) and the intrinsic parameters (including the optical distortion) are computed through a Levenberg-Marquardt Minimization algorithm which minimizes the error of reprojection between all the snapshots.

This process is a very famous technique based on Devernay and Faugeras's works[3].

2.1.4.2 Film Camera Offset

The global system developed here requires to put a tracking device directly attached to the targeted film camera. The witness camera position and orientation are estimated using the previously describer tracking technique. However, there is a problem of scale by using the same pattern for both film and witness cameras. Indeed, as our witness cameras use 180 degrees lenses, the circular shapes in the calibration pattern tend to appear really small in the witness camera view thus making them hard to detect.

We have created our own calibration chart which is actually made of two different size and contrast patterns. One part of the chart has pure black circles on a pure white background (for the witness cameras). A second part of the chart is made of pure white circles on a pure black background (Film Camera). We then use a very simple pattern detector to find both patterns for the witness and the film cameras. As we know the exact relative positioning of both patterns, the position and rotation of the film camera can be found by "propagating" the computed position and rotation of the witness camera and vice-versa. Indeed, since both cameras are directly attached together, we are able to utilize a lineup algorithm to accurately compute the 3D offset (R, T) between them. We have developed a lineup algorithm based on the previously described circular patterns. The patterns whose exact sizes, shapes and positions are known are separately recognized by both cameras, thus rising a trivial mathematical relation (Rotation and Translation) between the witness and the film cameras.

2.1.4.3 Tracking Phase

Separating the survey from the tracking process is only a pragmatic way to describe how the system is used on set. Indeed, the tracking process is not different from the tracking described in FIG. 2 and used during a survey. It however uses a simpler device (see FIG. 6) which is quite close to the survey device except that it does not include a touchscreen for obvious reasons.

Figure 2:
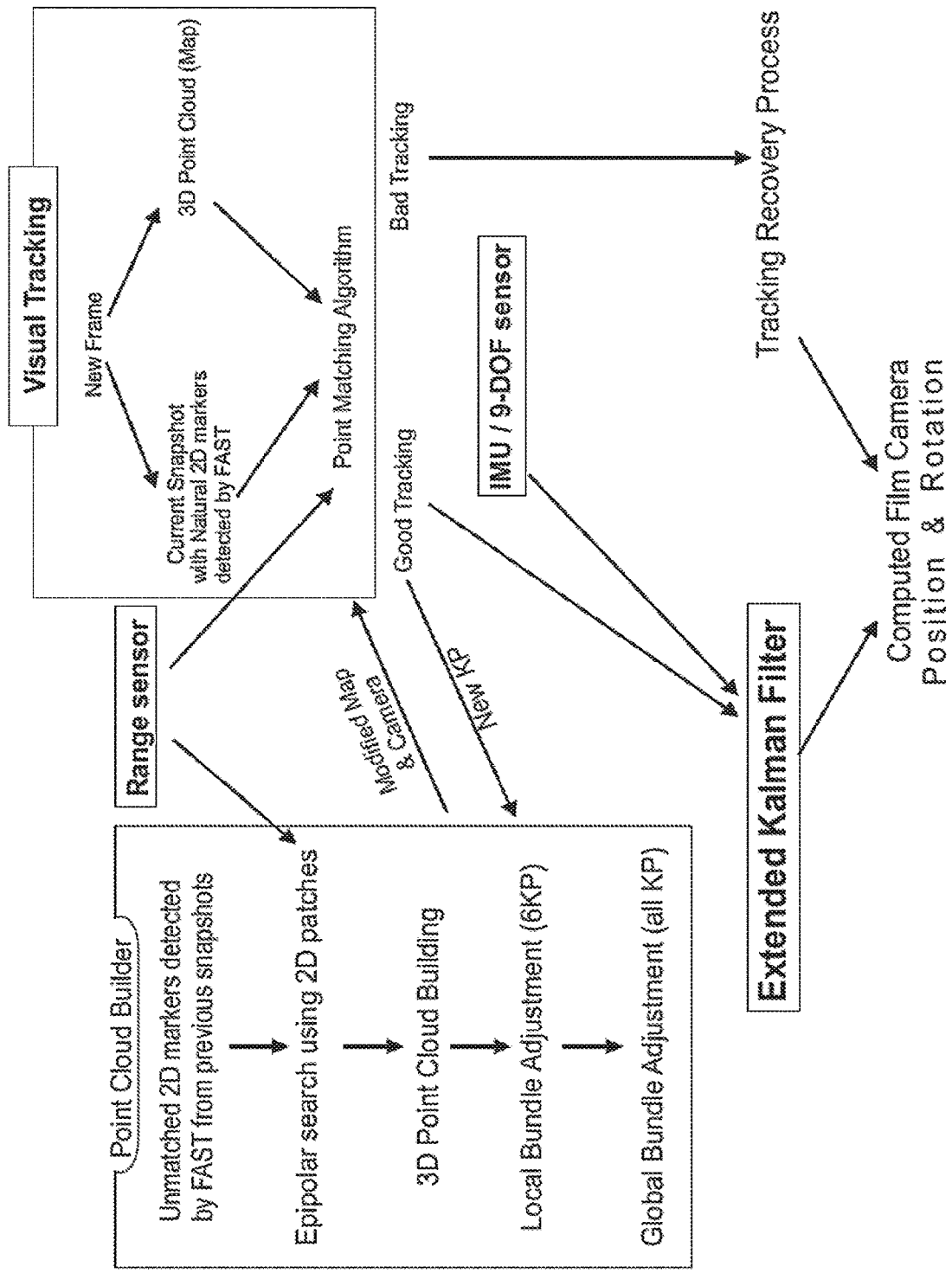
FIG. 2—Global tracking algorithm to obtain the position and rotation of a film camera in real-time.

The Visual Tracking rectangle of FIG. 2 depicts how a match is found between the 2D natural markers detected by FASTER in a new frame and the existing 3D point cloud. The 2D texture patches associated with every natural marker and coming from both sets of data are linearly compared. Once all feature points have been processed, a Gauss Newton algorithm is applied to find the best possible match and compute the position and orientation of the camera. Such a minimization algorithm usually require about 10 iterations to converge to the solution. In order to increase the robustness of the criteria to minimize, we utilize a statistical Tukey M-Estimator (maximum likelihood type estimator) [6]. This also ensures that the convergence is not disrupted by outliers.

Every tracking is done twice and on two different levels of the pyramid before obtaining the final parameters of the camera. First, the convergence of the algorithm is greatly increased by computing an approximation of the position and orientation of the camera through a coarse level of the image pyramid, and using a subset of the natural markers. Second, the same computation is achieved on a far bigger set (around 20 times bigger) and being merged with the previous approximation to obtain the final accurate result.

2.1.4.4 Tracking Failures and Recovery

During a camera tracking on a real set, many situation can happen where the visual tracking gets lost. This often occurs for example when people stay in front of the witness camera or the bar is simply hidden by objects. For all the cases where we lose the visual tracking, three different recovery threads are started at the same time and the one which first gets a recovery is accepted.

Using the prediction function of the Extended Kalman Filter (see section 2.3.2), it is possible to first attempt a camera position recovery starting a search from the EKF predicted parameters. Indeed, as the EKF is a prediction-correction algorithm, it always tries to guess what will be the next position of the camera before it actually moves to that position. When the prediction is correct, it thus possible to obtain an instant recover. In practice, that prediction works very well when the witness camera is hidden and when the system is tracking using the IMU. However, it often fails is there has also been a significant translation of the film camera while hiding the witness cameras.

The second level of recovery is very different. Every feature point has a rotation invariant descriptor associated to it, following the ORB (Oriented FAST and Rotated BRIEF) technique [18]. It first relies on the famous FAST[16] technique to compute multi-scale features (i.e. at the different levels of the image pyramid, see FIG. 4) associated to an Harris score [5]. The orientation of the descriptor is computed using an intensity centroid. The second descriptor is rBRIEF, which is a BRIEF descriptor [2] rotated following the orientation of the keypoint. Using these two descriptors, our technique is able to recover from positions where regular visual tracking techniques fail. For example, let's say we lose the visual tracking for any reason. Suppose we now translate and rotate by 90 degrees around the Z axis the camera while still being lost. The current image seen by the camera has never been learned before but it is still pointing to a direction where we add key positions and key points learned before. However as a regular recovery process is not rotation invariant, those systems fail to recover the tracking. In our case, the use of rotation invariant descriptors associated to every key point allows a fast recover (using a brute force matching technique) as soon as the film camera has been pointing somewhere into that position before (rotation does not matter).

Finally the third recovery thread is more brutal and computationally intensive. An ellipsoid (3D ellipse) is built around the last known camera position. That ellipsoid has a size made of the parameter covariance computed but the Extended Kalman Filter. Multiple samples are then generated inside the ellipsoid following the error covariance of the EKF. A RANSAC algorithm is applied to that set in order to find the best possible matching for the searched camera position and orientation.

2.2 Dynamic Zoom, Focus and Iris

During the global tracking process, a director or a director of photography for example might decide to zoom or focus on a character/object in the scene. Our technology integrates several regular encoders such as the ones proposed by Arri, but is also able to handle any other encoder to capture a zoom, focus and iris value in real-time. This allows dynamic zooming and depth of field on set.

2.3 Sensor Fusion Technique

All the pure optical based markerless techniques can fail to track in many situations. The most common case is not having enough natural markers left in the current view of the witness camera. In ideal situations this rarely happens as the user pays attention not to hide the lens with his hand for example. On real sets, that situation happens a lot simply because the camera crew often needs to change lenses, modify the camera rig, clean the lens, move to another shooting place, etc. On a regular marker-based and markerless (optical flow based) technique, this prevents the tracking system from finding a good estimate of the position and rotation of the camera.

We have created a sensor fusion method which automatically correct the position and the rotation of a witness camera using multiple sensors: witness cameras, gyroscop, accelerometer and magnetometer. That technique is the heart of our technology. The first step is the calibration of the system, meaning calibrating the 9-DOF IMU relatively to the witness cameras. It is a critical step to ensure that all the sensors actually work in the same basis. The relation between the 9-DOF sensor and the witness cameras is close to an hand-eye technique [20], but we have added several interesting scientific contributions to make it fit with our tracking algorithm.

2.3.1 IMU-Witness Camera Calibration

Let's consider the transformation $R_{IMU \to C}$ which computes the rotation from the 9-DOF sensor (IMU) to one of the two witness cameras (C). $R_{IMU}$ is known in its local basis and $R_C$ is also know in its own local basis. The goal is to solve $R_{IMU \to C}$ for $R_C = R_{IMU \to C} \cdot R_{IMU}$.

$R_{IMU \to C}$ is ensured to be always constant as the relation between the IMU and the cameras does not change over time (they are both attached to the static camera bar).

It is thus possible to write for $t_i$, $i \in [0, n]$:

$$R_C^{t_0} = R_{IMU \to C} \cdot R_{IMU}^{t_0}$$
$$\vdots$$
$$R_C^{t_{n-1}} = R_{IMU \to C} \cdot R_{IMU}^{t_{n-1}}$$
$$R_C^{t_n} = R_{IMU \to C} \cdot R_{IMU}^{t_n}$$

We can deduce from the previous equations:

$$R_C^{t_1 - t_0} = R_{IMU \to C} \cdot R_{IMU}^{t_1 - t_0}$$
$$\vdots$$
$$R_C^{t_{n-1} - t_{n-2}} = R_{IMU \to C} \cdot R_{IMU}^{t_{n-1} - t_{n-2}}$$
$$R_C^{t_n - t_{n-1}} = R_{IMU \to C} \cdot R_{IMU}^{t_n - t_{n-1}}$$

with the relations:

$$R_C^{t_i - t_{i-1}} = R_C^{t_i} \cdot (R_C^{t_{i-1}})^{-1}$$

$$R_{IMU}^{t_i - t_{i-1}} = R_{IMU}^{t_i} \cdot (R_{IMU}^{t_{i-1}})^{-1}$$

The rotation measurement given by gyroscop and the visual tracking are supposed to be the same. It is thus logical to consider that $R_{IMU}$ and $R_C$ describe the same angles of rotation but in different bases. Using the log map of the rotation matrix in Algebra Lie defined as Log: $SO(3) \to so(3)$, it is possible to convert the matrix $R_C$ to an axis-angle $(\vec{r}_c, \alpha)$ representation:

$$\alpha = \arccos\left(\frac{tr(R_C) - 1}{2}\right)$$

$$\vec{r}_c = \frac{1}{2\sin\alpha} \begin{bmatrix} R_c(3,2) & R_c(2,3) \\ R_c(1,3) & R_c(3,1) \\ R_c(2,1) & R_c(1,2) \end{bmatrix}$$

with $tr(R_c)$ being the trace of the matrix such as $tr(R_c) = \sum_{j=1}^{3} R_c(j,j)$.

We can now write the following overdetermined equation system:

$$S = \begin{cases} \vec{r}_c^{t_1 - t_0} = R_{IMU \to C} \cdot \vec{r}_{IMU}^{t_1 - t_0} \\ \vdots \\ \vec{r}_c^{t_{n-1} - t_{n-2}} = R_{IMU \to C} \cdot \vec{r}_{IMU}^{t_{n-1} - t_{n-2}} \\ \vec{r}_c^{t_n - t_{n-1}} = R_{IMU \to C} \cdot \vec{r}_{IMU}^{t_n - t_{n-1}} \end{cases} \quad (8)$$

As for any overdetermined system, it is possible to solve the previous rectangular matrix using a Singular Value Decomposition (SVD) as $S = U\sigma V^t$, with U the m×n matrix of the eigenvectors of $S \cdot S^t$, V the n×n matrix of the eigenvectors $S^t \cdot S$ and D the n×n diagonal matrix of the ordered singular values of S.

The previous solution of the equation is subject to noise coming from measurements. Therefore we apply a Levenberg-Marquardt minimization scheme to minimize the error:

$$E = \|(R_{IMU \to C} \times \vec{r}_{IMU}^{t_i - t_{i-1}}) \cdot \vec{r}_C^{t_i - t_{i-1}} - 1\| \quad (9)$$

Now that we have a mathematical relation between the IMU and the witness cameras, it is possible to inject all measurement to the Extended Kalman Filter in order to extract the very best of every sensor and compute the Rotation and Translation of the film camera.

2.3.2 Extended Kalman Filter

The Extended Kalman Filter (EKF) is a very well known technique in Aerospace and Robotics research areas to merge different data coming from multiple different sensors. It is essentially used to estimate the parameters of a non linear system from noisy measurements by computing an estimation error and applying two phases: prediction and correction. In the prediction phase, the Kalman filter computes the new parameters as well as a related error at a timestep using the parameters and the error estimated at the previous timestep. The correction phase updates the prediction using new noisy measures. Those new measures allow to compute new estimated parameters and error from the predicted parameters and error. If the error is bigger than a given threshold, the parameters are corrected.

In our case here, the EKF is developed in a very specific way as we have multiple measurements related to 3D rotations (gyroscop+witness cameras) and they cannot be interpolated easily.

The idea of an EKF for our technology is to put some sort of confidence value to every measurement (witness camera, gyroscop, magnetometer, accelerometer) and to iteratively correct the current estimated position and rotation using the sensor which obtains the best confidence score. In practice, the EKF is a bit more complicated than that and can be mathematically described as a prediction-correction algorithm for nonlinear systems. Considering a state vector $\hat{X}(t)$ at a timestep t, the algorithm applies the current physical model of our movement equations to predict a new state of the vector $\hat{X}(t)$ becoming $\hat{X}(t)^{\Delta t}$. The correction phase then generates a new state vector $\hat{X}(t+\Delta t)$ at a timestep $t+\Delta t$.

The EKF model can be written as follows in our case:

$$\begin{cases} Y(l) = h(X(t), B) \\ \hat{X}(t)^{\Delta t} = f(\hat{X}(t), \Delta t) \end{cases} \quad (10)$$

with h being the state equations for our observables and $X_t$ being the vector of Translation, Rotation, Translation Velocity and Angular Velocity in the global basis, and $f$ the update function of the state vector. B is the global noise in the system.

Definition of h $$Y(t) = h(X(t), B) \quad (11)$$

If on one hand we consider the measurements coming from the markerless visual tracking (i.e. witness cameras here) as $h_{witness}$, and on the other hand the measurements coming from the IMU as $h_{IMU}$, we can tell that h is made of two types of observables, $h_{witness}$ and $h_{IMU}$. By definition, h is a trivial function and its general form is given by identification: $Y_{witness}(t) = X(t)$ and $Y_{IMU}(t) = X(t)$. Depending on the kind of sensors which is sending the measures, we can now write two different version of h and thus rewriting the equation 11 for the visual tracking case as:

$$Y(t) = \begin{cases} Y_{witness}(t) \cdot T = X(t) \cdot T \\ Y_{witness}(t) \cdot R = X(t) \cdot R \\ Y_{witness}(t) \cdot \vec{V} = X(t) \cdot \vec{V} \\ Y_{witness}(t) \cdot \vec{\Omega} = X(t) \cdot \vec{\Omega} \end{cases} \quad (12)$$

$Y_{witness}(t) \cdot \{\alpha \in T, R, V, \Omega\}$ being the observables $y (y \in \Re^{12})$ of the visual tracking at a timestep t for the Translation (T, in meters), Rotation (R, in radians), Velocity ($\vec{V}$, in m·s$^{-1}$) and Angular Velocity ($\vec{\Omega}$, in rad·s$^{-1}$).

In the case where the sensor is a gyroscop, equation 11 becomes:

$$Y(t) = \begin{cases} Y_{IMU}(t) \cdot R = X(t) \cdot R \\ Y_{IMU}(t) \cdot \vec{\Omega} = X(t) \cdot \vec{\Omega} \end{cases} \quad (13)$$

$Y_{IMU}(t) \cdot \{\alpha \in R, \Omega\}$ being the observables of the IMU at a timestep t for the Rotation (R, in radians) and Angular Velocity ($\vec{\Omega}$, in rad·s$^{-1}$). There is indeed no computable translation or velocity using a 9-DOF sensor.

Definition of $f$ $$\hat{X}(t)^{\Delta t} = f(\hat{X}(t), \Delta t) \quad (14)$$

with $\hat{X}(t)^{\Delta t}$ being the predicted state vector at timestep t+Δt, and $\hat{X}(t)$ the estimated state vector at timestep t.

The function $f$ is the update function of the state vector and is defined as:

$$\hat{X}(t)^{\Delta t} = \begin{cases} \hat{X}(t) \cdot T + \hat{X}(t) \cdot V \cdot \Delta_t \\ \hat{X}(t) \cdot R \times \hat{X}(t) \cdot \Omega \cdot \Delta_t \\ \hat{X}(t) \cdot \vec{V} \\ \hat{X}(t) \cdot \vec{\Omega} \end{cases} \quad (15)$$

Note that the regular update function of the Kalman Filter is not usable to our case as the Rotation Matrices cannot be interpolated and being written a linear form A·X+B.

Prediction Step

The prediction step is written using the definition of the Kalman filter:

$$\hat{X}(t)^{\Delta t} = f(\hat{X})(t), \Delta t) \quad (16)$$

$$P_t^{\Delta t} = A_t \cdot P_t \cdot \Delta_t^T + Q \cdot \Delta t \quad (17)$$

with:
$P_t^{\Delta t}$ the covariance matrix of the predicted error at the timestep t+Δt,
$P_t$ the covariance matrix of the error at the timestep t,
A the transition matrix such as $$A_t = \frac{\partial f}{\partial X_t}$$

|$\hat{X}_{t-1}$, $A_t$ is rue jacobian matrix of $f$ and computed as a sum of finite differences:

$$\frac{f(x + \Delta) - f(x)}{\Delta},$$

Q is the covariance matrix 12×12 of the noise of the state vector. The noise of the translation state vector is heuristically put at 1e$^{-2}$, as well as the noise of the rotation state vector to 1·e$^{-3}$.

$$Q = \begin{bmatrix} 0.01\,T & 0.0 & 0.0 & 0.0 \\ 0.0 & 0.001\,R & 0.0 & 0.0 \\ 0.0 & 0.0 & 0.0\,V & 0.0 \\ 0.0 & 0.0 & 0.0 & 0.0\,\Omega \end{bmatrix}$$

Correction Step

Following the Kalman definition, the correction in our case is written as:

$$K(t+\Delta t) = P_t^{\Delta t} \cdot H^T(t+\Delta t) \cdot (U(t+\Delta t) + H(t+\Delta t) \cdot P_t^{\Delta t} \cdot H^T(t+\Delta t))^{-1} \quad (18)$$

$$P(t+\Delta t) = (1 - K(t+\Delta t) \cdot H(t+\Delta t)) \cdot P_t^{\Delta t} \quad (19)$$

$$\hat{X}(t + \Delta t) = \begin{cases} \hat{X}(t)^{\Delta t} \cdot T + K(t + \Delta t) \times J_{witness|IMU} \cdot T \\ \hat{X}(t)^{\Delta t} \cdot R \times K(t + \Delta t) \times J_{witness|IMU} \cdot R \\ \hat{X}(t)^{\Delta t} \cdot V + K(t + \Delta t) \times J_{witness|IMU} \cdot V \\ \hat{X}(t)^{\Delta t} \cdot \Omega \times K(t + \Delta t) \times J_{witness|IMU} \cdot \Omega \end{cases} \quad (20)$$

with:
I the identity matrix,
K(t+Δt) the Kalman gain at timestep t+Δt,
H being the jacobian matrix of the function h, itself being $h_{witness}$ or $h_{IMU}$ depending on the current selected sensor.

$$H(t \mid \Delta t) = \frac{\partial h}{\partial X} \bigg|_{\hat{X}_t^{\Delta t}} \quad (21)$$

In our case, the jacobian is computed as a sum of finite differences:

$$\frac{h_{witness|IMU}(x + \Delta) - h_{witness|IMU}(x)}{\Delta}$$

U(t+Δt) is the covariance matrix of the noise measurements of the currently selected sensor (witness camera or IMU). That value is modified depending on the quality of the measure (confidence value). In the case of a visual tracking, it relies on the tracking error ε:

$$U(t + \Delta t) = \begin{cases} 0.0001 & \text{if } \varepsilon < 1.0 \text{ pixel} \\ 10.0 & \text{if } \varepsilon \geq 1.0 \text{ pixel} \end{cases} \quad (22)$$

It is even easier to determine U(t+Δt) for the IMU as the noise errors are directly given by the manufacturer for all the sensors. The previous equation is directly replaced by those errors.

P(t+Δt) is the covariance matrix of the error at the timestep t+Δt.

V and Ω are the matrix representation of the velocity vector $\vec{V}$ and the angular velocity $\vec{\Omega}$ respectively.

$J_{witness|IMU}$ of equation 20 is also written following the kind of sensors:

$$J_{witness} \cdot T = y(t+\Delta t) \cdot T - \hat{Y}_t^{\Delta t} \cdot T$$

$$J_{witness} \cdot R = y(t+\Delta t) \cdot R \times \hat{Y}_t^{\Delta t} \cdot R^{-1}$$

$$J_{witness} \cdot V = y(t+\Delta t) \cdot V - \hat{Y}_t^{\Delta t} \cdot V$$

$$J_{witness} \cdot \Omega = y(t+\Delta t) \cdot \Omega \times \hat{Y}_t^{\Delta t} \cdot \Omega$$

$$J_{IMU} \cdot R = y(t+\Delta t) \cdot R \times \hat{Y}_t^{\Delta t} \cdot R^T$$

$$J_{IMU} \cdot \Omega = y(t+\Delta t) \cdot \Omega \times \hat{Y}_t^{\Delta t} \cdot \Omega^{-1}$$

$y(t+\Delta t)$ is the current measurement given by the selected sensor. $y(t+\Delta t) \cdot (\alpha \in \{R, T, V, \Omega\})$ is the measurement of the Translation, Rotation, Velocity and angular Velocity respectively. $J \cdot (\alpha \in \{R, T, V, \Omega\})$ is known as the Kalman Innovation.

2.4 3D Reconstruction and Depth Keying

The real-time 3D reconstruction is achieved using a 3D range sensor integrated into our camera bar. That range sensor can be a structured light device (Microsoft Kinect, Asus Xtion for example) or a time-of-flight camera (like an Advanced Scientific Concept's TigerEye for example) also known as Flash Lidar. Both techniques have limitations and our technology only uses a short range sensor Asus Xtion for now. As usual, a step of calibration is required to know the position of the Asus Xtion relatively to the witness cameras. We simply use the exact same technique than for the witness to film lineup (see section 2.1.4.2). As the range sensor has a greyscale camera, we use our usual calibration pattern to have it detected in both cameras: the range sensor's camera and one of our witness cameras. That process is pretty straightforward and similar to 2.1.4.2.

The range sensor is used for two purposes in our technology. On one hand it helps deleting bad feature points created far away behind objects for example. A simple reprojection of the feature points onto the depth map of the range sensor can tell if the feature point is correct or not. During the stereoscopic tracking (see section 2.5), every point created by the epipolar geometry can still be closer or farther than the estimation given by the epipolar lines. We compare the reconstructed 3D point to the current value of its reprojection into the range sensor's depth map to enhance its accuracy or simply reject it.

The second use of the range sensor relies on the depth map itself. As it gives the depth at a maximum range of 12 m, we area able to occlude every people (actor) in the set within that range by the virtual characters/objects and vice-versa. This is called dynamic occlusions and raises another level of realism for visual effects in both movies and live-broadcasting. Our technology uses the main film camera feed (this could also be achieved adding an additional high resolution witness camera) to enhance the resolution of the range sensor by re-projecting the depth onto the film camera and refining the results (edge enhancement). Such a technology is able to provide real-time depth keying and thus eliminating the use of a binding green screen especially when a more powerful range sensor is used (Flash Lidar).

2.5 Stereoscopic Markerless Technique

The previously described technique using a monoscopic approach is actually not efficient enough on real situations. As it requires a known real object to be used as registration to compute the scale, orientation and position of the world, it is often hard to use it on movies where many people are always on your path when you're trying to register (detect) the object. But the main limitation of that monoscopic approach is the fact it requires to survey the scene. As an homography has to be used for the initialization of the system, it implies that a technician has to come to the set to start surveying it. In practice, that operation is rarely successfully achieved as people working on set never leave the place before the very last seconds.

We have built a stereoscopic approach to get rid of that limitation and thus bringing the fully original notion of instant survey and tracking.

2.5.1 Instant Survey

The stereoscopic technique embedded in the camera tracking is a major step forward compared to any other technique including our monscopic approach previously described. Indeed the use a 2 pre-calibrated witness cameras brings several advantages. The first one is the Instant Survey. Unlike the technique described in the monoscopic approach, there is no prior survey required for the scene. As the exact distance between the two witness cameras is perfectly known, and as they are synchronized using their internal genlock hardware capabilities, we are able to get a point cloud instantly without moving the bar. The homography described in paragraph is then not used anymore as the 3D reconstruction of a point is brought by the two witness camera through the theory of Stereovision. The second major point is that there is no manual scale required. During the capture of the two video streams, we run a Levenberg-Marquardt minimization scheme to minimize the sum of the pixel error between the projection of the 3D point estimated by epipolar geometry and the 2D feature point detected in the current video.

2.5.2 Automatic-Registration

Using an instant survey however raises a new issue which is the impossibility of using a, registration object like the one that was detected in the monoscopic approach. The main reason of that limitation comes from the fact that the camera bar is directly attached to film camera and it is not possible to ask to the camera crew to move their camera around to learn the registration object. That is why we have added a second automatic registration which does not require any physical registration object to be added to the scene. It however requires the user to have two different interactions with the point cloud: a point selection to tell to the system what is the point we intend to use as a ground reference, and a manual rotation around the Y (vertical) axis to properly orient the CG content relatively to the scene.

In order to be able to only have these two very fast and very simple user interactions, we must then compute all the other left degrees of freedom, meaning computing an orthonormal basis having a Y axis perfectly vertical and a correct scaling. Our technology simply takes advantage of the embedded accelerometer in the bar to compute the gravity orientation, i.e. the Y axis. The magnetometer gives the north direction and thus provides an approximate vector that allows us to compute an orthonormal basis using regular cross products.

The scale is even much easier to compute. It is fully instant and automatic and does not require any user interaction. As the distance between the witness cameras is accurately known, all the 3D reconstructed points directly have the right scale so there is no additional object to be detected like in regular pure structure from motion (SFM) algorithms.

2.5.3 Instant Tracking

The tracking process is slightly different from the one described for the monoscopic approach in section 2.1.4.3. Every new point is created by using epipolar geometry which ensures that the scale and depth of a 3D feature point is always correct. This means that as soon as our system is started, it is already tracking thanks to that lightspeed accurate and instant survey.

We compute the union of all the reprojected 3D points being seen from the left and right cameras to ensure a maximum stability of the tracking process. The point cloud is simply generated by the 3D intersection of the epipolar lines combined with the ORB descriptor for the feature matching (see section 2.1.4.4). The feature matching and global minimization scheme remains similar to the one used in the monoscopic approach.

In order to be able to rely on the instant survey, we have also highly modified the way new points are built in the point cloud. In addition to the stereoscopic reconstruction of the point, we have added the notion of grid dispersion and uniformity of feature points. During a regular tracking algorithm, a 2D feature detection algorithm is launched and points are reconstructed in 3D as described in section 2.1.3.3 and 2.1.4.4. However, many of these points are unreliable (bad depth, edge points, moving points, shadow points, etc.) and the algorithm tends to learn a lot of point in high contrast areas and nothing in low contrast areas. This generates a lot of noise in the tracking data giving the feeling the camera is shaking. The grid dispersion technique that we have created tries to distribute the natural markers learned by the system in an almost uniform way. We first start by using a very high threshold to generate a maximum of feature points. We then reduce the number of feature points according to a threshold given by the user (16×16 grid, 2 samples per cell for example) using a Harris score (we chose the 2 best points for example). Every point thus has a quality criteria used to say how reliable it is. If the uniformity is not good enough, the system also locally changes the contrast threshold to ensure being able to catch points even in low contrast areas. The fact that our algorithm distributes the feature points across the picture also prevents the system from losing the tracking easily. Indeed, regular monoscopic approaches without a grid dispersion technique like ours may have a lot of points for tracking in the lower left part of the picture for example. If an actor gets into that are hiding all these natural markers, the tracking will be instantly lost, which is something that cannot happen in our case as we distribute the feature on the whole picture.

2.6 Augmenting the Real World 2.6.1 the Camera/Witness Delay Problem

As the film camera and the witness cameras run at different speeds, they might generate different delays in the frame acquiring process. The film camera is actually the one which creates far the highest delay forcing us to compute it in order to properly augment the real world.

We use our own calibration device again to automatically compute the delay between two cameras. A small sun-bright led flashing at 1 Hz is used in front of both cameras. A blob detector algorithm enhanced by an intensity thresholding technique has been developed to detect the led in both cameras. The related intensity curves that are generated from the capture of the led intensity in the cameras are compared using a minimization algorithm in order to find the best temporal coherency between samples. Several statistical parameters are thus minimized and a delay in milliseconds is automatically extracted from the calibration in around 10 seconds.

2.6.2 Rendering and Augmented Reality

Once we have a camera tracking working, our software can receive data from different CG content generator softwares like Autodesk MotionBuilder for example. Those data are directly integrated and rendered inside our software (in the case where the tracking and the rendering workstation are merged, see FIG. 1) to be composited with the real background or foreground (in case of a green stage).

Another interesting feature inherent to our technology is the 3D Garbage Matting. Garbage Matting is certainly not our invention but it is done in an innovative way in our case. Indeed, as our tracking algorithm generates an accurate 3D point cloud (thanks to the stereoscopic approach), all these points have a representation in both 3D and 2D when being reprojected onto the Film Camera video. We have developed a simple user interface that allows the user to select multiple points within the 3D point cloud. We thus create a 3D object by triangulating all the selected points using an Ear Triangulation algorithm [14]. That newly created surface can now be activated as a Garbage Matting Object, meaning that every pixel covered by the 2D projection of that object onto the film camera video is now replaced by the 3D virtual environment generated by the 3D Content Generating Workstation (see section 1). Note that in the case of the use of a long range depth sensor (i.e. at least 50 m) the Garbage Matting technique becomes useless as our depth keying method easily replaces it (see section 2.4).

The invention claimed is:

1. A markerless system, the system including:
   (i) a hand-held or portable monoscopic video camera;
   (ii) sensors including an accelerometer and a gyro sensing over six degrees of freedom;
   (iii) two witness cameras forming a stereoscopic system, in which the monoscopic video camera does not form part of the stereoscopic system;
   (iv) a camera tracking system in connection with the monoscopic video camera; and
   (v) a rendering station in wireless connection with the camera tracking system;
   the markerless system being for mixing or compositing in real-time, computer generated 3D objects and a video feed from the video camera, to generate real-time augmented reality video for TV broadcast, cinema or video games, in which:
   (a) the sensors in or attached directly or indirectly to the video camera provide real-time positioning data defining the 3D position and 3D orientation of the video camera, or enabling the 3D position and 3D orientation of the video camera to be calculated, wherein the sensors are configured to output the real-time positioning data to the camera tracking system;
   (b) the two witness cameras forming the stereoscopic system are fixed directly or indirectly to the video camera;
   (c) the rendering station is configured to receive wirelessly and to use real-time positioning data automatically to create, recall, render or modify computer generated 3D objects;
   (d) the rendering station is configured to mix-in or to composite the resulting computer generated 3D objects with the video feed from the video camera to provide augmented reality video for TV broadcast, cinema or video games;
   and in which:
   (e) the camera tracking system is configured to determine the 3D position and orientation of the video camera with reference to a 3D map of the real-world, wherein the camera tracking system is configured to generate the 3D map of the real-world, at least in part, by using the real-time 3D positioning data from the sensors plus a video flow in which the two witness cameras forming the stereoscopic system survey a scene, and in which the camera tracking system is configured to detect natural markers in the scene that have not been manually or artificially added to that scene, and to use a constant velocity model associated with the information provided by the sensors to predict a next position of the monoscopic video camera using the previously correctly computed or confirmed position.

2. The system of claim 1, the monoscopic video camera including an eyepiece, wherein the system is configured such that the mixed-in or composited computer generated 3D objects with the video feed from the video camera are streamed wirelessly to the monoscopic video camera and are displayed by the eyepiece.

3. The system of claim 1, in which the sensors include a magnetometer measuring absolute heading in 3D, and hence the sensors sense over nine degrees of freedom.

4. The system of claim 1 in which the sensors include a 3D range sensor.

5. The system of claim 4 in which the depth of edges is refined by re-projecting 3D range sensor depths onto a high resolution video feed of the monoscopic video camera.

6. The system of claim 4 in which the 3D range sensor is used to enhance the accuracy of a depth measurement associated with a reconstructed 3D point, or to reject that reconstructed 3D point.

7. The system of claim 6 in which the 3D range sensor is used for real-time depth keying to enable dynamic occlusion and suppress use of a green stage.

8. The system of claim 1 in which keyframes generated by the witness cameras are real-time images computed by the processor at four different resolution levels of the witness cameras' video feed.

9. The system of claim 1 in which the camera tracking system runs a fusion algorithm that combines optical flow data from the witness cameras with the real-time positioning data from the sensors.

10. The system of claim 9 in which the fusion algorithm is based on an Extended Kalman Filter prediction/correction technique to integrate outputs from, and to re-calibrate, all the sensors, selected from a group including an accelerometer, a gyroscope, a magnetometer, a 3D range sensor, to determine the position and orientation of the body.

11. The system of claim 10 in which the Extended Kalman Filter fusion algorithm uses confidence level data, associated with the output from each sensor, when determining how to merge the data from each sensor.

12. The system of claim 1 in which the pair of stereoscopic witness cameras each provides at least 100 fps, to enable the system to be fully initialized without a separate stage of purely surveying the scene to be tracked (called 'instant survey'), and in which surveying takes place continuously whilst the camera is being used to capture video.

13. The system of claim 12 in which the pair of stereoscopic witness cameras provide images, and in which software executing on the camera tracking system processes the images and, even with the body not being moved at all, generates an instant 3D point cloud.

14. The system of claim 13 in which a depth of each pixel in the 3D point cloud is obtained using corresponding 2D texture patches obtained from each stereoscopic witness camera and an epi-polar line search algorithm.

15. The system of claim 1, in which the camera tracking system is portable.

16. The system of claim 1 in which the camera tracking system is configured to generate a uniformly distributed point cloud in the 3D map.

17. The system of claim 1, in which real-time zoom, focus and iris settings of the video camera are measured, and used, together with the real-time positioning data, so that the 3D objects are correctly rendered in a desired location and orientation in a 3D scene.

18. The system of claim 1 that enables real-time, continuous surveying of the scene to generate a more complete point cloud defining the scene.

19. The system of claim 1 that attaches rotation invariant descriptors, to feature points detected in the scene to facilitate recovery of tracking.

20. The system of claim 1 in which a user can use a 3D point cloud generated by the system to define 3D masks.

21. The system of claim 1 that uses that prediction to re-project a 3D point cloud onto the current frame, to enable a point matching algorithm to match points identified in the real-time video feed from the stereoscopic witness cameras and the projected points in the new, 3D point cloud.

22. The system of claim 21 that uses a Levenberg-Marquardt minimization scheme for camera tracking to minimize an error between the points identified in the real-time video feed from the stereoscopic witness cameras and the projected points in the new, 3D point cloud.

23. The system of claim 1 in which the monoscopic video camera and a witness camera are calibrated for frame acquisition delay using a modulated light source, such as by comparing light intensity curves associated with a flashing LED.

24. A markerless method for mixing or compositing real-time, computer generated 3D objects and a video feed from a hand-held or portable monoscopic video camera, to generate augmented reality video for TV broadcast, cinema or video games, in which:
 (a) sensors, including an accelerometer and a gyro sensing over six degrees of freedom, in or attached directly or indirectly to the hand-held or portable video camera provide real-time positioning data defining the 3D position and 3D orientation of the video camera, or enabling the 3D position and 3D orientation of the video camera to be calculated, and the sensors output the real-time positioning data to a camera tracking system;
 (b) two witness cameras forming a stereoscopic system are fixed directly or indirectly to the video camera;
 (c) a rendering station in wireless connection with the camera tracking system receives and uses real-time positioning data to then automatically create, recall, render or modify computer generated 3D objects;
 (d) the rendering station mixes in or composites the resulting computer generated 3D objects with the video feed from the video camera to provide augmented reality video for TV broadcast, cinema or video games;
and in which:
 (e) the camera tracking system determines the 3D position and orientation of the video camera with reference to a 3D map of the real-world, wherein the camera tracking system generates the 3D map of the real-world, at least in part, by using the real-time 3D positioning data from the sensors plus a video flow in which the two witness cameras forming the stereoscopic system survey a scene, and the camera tracking system detects natural markers in the scene that have not been manually or artificially added to that scene, and the camera tracking system uses a constant velocity model associated with the information provided by the sensors to predict a next position of the monoscopic video camera using the previously correctly computed or confirmed position.

25. The method of claim 24 in which the computer generated 3D animation objects are automatically scaled to a correct size using stereoscopic algorithms.

26. A camera tracking system, the camera tracking system connectable to a hand-held or portable monoscopic video camera, wherein two witness cameras forming a stereoscopic system, in which the monoscopic video camera does not form part of the stereoscopic system, are fixed directly or indirectly to the video camera, wherein sensors including an accelerometer and a gyro sensing over six degrees of freedom are in or attached directly or indirectly to the video camera and provide real-time positioning data defining the 3D position and 3D orientation of the video camera, or enable the 3D position and 3D orientation of the video camera to be calculated, wherein the camera tracking system is configured to receive the real-time positioning data from the sensors; wherein the camera tracking system is wirelessly connectable to a rendering station, and is configured to wirelessly transmit real-time positioning data to the rendering station;

wherein the camera tracking system is configured to determine the 3D position and orientation of the video camera with reference to a 3D map of the real-world, wherein the camera tracking system is configured to generate the 3D map of the real-world, at least in part, by using the real-time 3D positioning data from the sensors plus a video flow in which the two witness cameras forming the stereoscopic system survey a scene, and in which the camera tracking system is configured to detect natural markers in the scene that have not been manually or artificially added to that scene, and to use a constant velocity model associated with the information provided by the sensors to predict a next position of the monoscopic video camera using the previously correctly computed or confirmed position.

27. The camera tracking system of claim 26, in which the camera tracking system runs a fusion algorithm that combines optical flow data from the witness cameras with the real-time positioning data from the sensors.

28. The camera tracking system of claim 26, in which the camera tracking system is portable.

29. The camera tracking system of claim 26, in which the camera tracking system is configured to generate a uniformly distributed point cloud in the 3D map.

30. The camera tracking system of claim 26, in which the pair of stereoscopic witness cameras provide images, and in which software executing on the camera tracking system processes the images and, even with the body not being moved at all, generates an instant 3D point cloud.

31. The camera tracking system of claim 26, that uses that prediction to re-project a 3D point cloud onto the current frame, to enable a point matching algorithm to match points identified in the real-time video feed from the stereoscopic witness cameras and the projected points in the new, 3D point cloud.

32. The camera tracking system of claim 31, that uses a Levenberg-Marquardt minimization scheme for camera tracking to minimize an error between the points identified in the real-time video feed from the stereoscopic witness cameras and the projected points in the new, 3D point cloud.

33. The camera tracking system of claim 26, wherein the system is configured to use that real-time positioning data automatically to create, recall, render or modify computer generated 3D objects; and the system is configured to mix-in or to composite the resulting computer generated 3D objects with the video feed from the video camera to provide augmented reality video for TV broadcast, cinema or video games.

* * * * *